United States Patent
Yoon

(10) Patent No.: US 10,241,627 B2
(45) Date of Patent: Mar. 26, 2019

(54) METHOD FOR PROCESSING INPUT AND ELECTRONIC DEVICE THEREOF

(71) Applicant: Samsung Electronics Co., Ltd., Suwon-si, Gyeonggi-do (KR)

(72) Inventor: Sung-Jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/584,314

(22) Filed: Dec. 29, 2014

(65) Prior Publication Data
US 2015/0185923 A1    Jul. 2, 2015

(30) Foreign Application Priority Data
Jan. 2, 2014  (KR) .................. 10-2014-0000352

(51) Int. Cl.
*G06F 3/044* (2006.01)
*G06F 3/0488* (2013.01)
*G06F 3/041* (2006.01)

(52) U.S. Cl.
CPC ............ *G06F 3/044* (2013.01); *G06F 3/0416* (2013.01); *G06F 3/04883* (2013.01); *G06F 2203/04101* (2013.01); *G06F 2203/04808* (2013.01)

(58) Field of Classification Search
CPC ..... G06F 3/044; G06F 3/0416; G06F 3/04883
See application file for complete search history.

(56) References Cited

U.S. PATENT DOCUMENTS

| | | | |
|---|---|---|---|
| 5,945,980 A * | 8/1999 | Moissev | G06F 3/044 178/18.01 |
| 7,847,789 B2 | 12/2010 | Kolmykov-Zotov et al. | |
| 7,855,718 B2 | 12/2010 | Westerman | |
| 9,229,573 B2 * | 1/2016 | Igarashi | G06F 3/041 |
| 2006/0244733 A1 * | 11/2006 | Geaghan | G06F 3/041 345/173 |
| 2008/0046425 A1 * | 2/2008 | Perski | G06F 3/04883 |
| 2009/0284496 A1 * | 11/2009 | Oki | G06F 3/0346 345/174 |
| 2009/0289914 A1 * | 11/2009 | Cho | G06F 3/044 345/173 |
| 2009/0309851 A1 * | 12/2009 | Bernstein | G06F 3/0416 345/174 |
| 2009/0315848 A1 * | 12/2009 | Ku | G06F 3/0416 345/173 |

(Continued)

FOREIGN PATENT DOCUMENTS

JP      2010-117174 A    5/2010
KR   10-2011-0064530 A   6/2011
(Continued)

*Primary Examiner* — Nitin Patel
*Assistant Examiner* — Robert M Stone
(74) *Attorney, Agent, or Firm* — Jefferson IP Law, LLP

(57) ABSTRACT

A method configured to process an indirect touch or direct touch input to a touch screen with various input means is provided. The method includes, if a 1st input means is positioned in a 1st position spaced apart from a touch screen, acquiring 1st sensing information based on the 1st position, if the 1st input means is positioned in a 2nd position spaced apart from the touch screen, acquiring 2nd sensing information based on the 2nd position, and identifying the 1st input means based on the acquired 1st sensing information and the acquired 2nd sensing information.

9 Claims, 16 Drawing Sheets

(56) References Cited

U.S. PATENT DOCUMENTS

| | | | |
|---|---|---|---|
| 2010/0095206 A1* | 4/2010 | Kim | G06F 3/017 715/702 |
| 2010/0107099 A1* | 4/2010 | Frazier | G06F 3/044 715/765 |
| 2010/0225604 A1* | 9/2010 | Homma | G06F 3/0414 345/173 |
| 2011/0074701 A1* | 3/2011 | Dickinson | G06F 3/041 345/173 |
| 2011/0093778 A1* | 4/2011 | Kim | G06F 3/041 715/702 |
| 2011/0122087 A1* | 5/2011 | Jang | G06F 3/044 345/174 |
| 2011/0134061 A1 | 6/2011 | Lim | |
| 2011/0157006 A1* | 6/2011 | Miyazawa | G06F 3/0488 345/156 |
| 2011/0254571 A1 | 10/2011 | Togura et al. | |
| 2012/0026113 A1* | 2/2012 | Kasahara | G06F 3/0482 345/173 |
| 2012/0050180 A1* | 3/2012 | King | G06F 3/0416 345/173 |
| 2012/0120002 A1 | 5/2012 | Ota | |
| 2012/0133585 A1* | 5/2012 | Han | G06F 3/017 345/158 |
| 2012/0162105 A1* | 6/2012 | Sakurai | G06F 3/0488 345/173 |
| 2012/0182238 A1 | 7/2012 | Lee | |
| 2012/0200531 A1* | 8/2012 | Araki | G06F 3/0418 345/174 |
| 2012/0262398 A1* | 10/2012 | Kim | G06F 3/041 345/173 |
| 2012/0299851 A1* | 11/2012 | Homma | G06F 3/0488 345/173 |
| 2013/0021293 A1* | 1/2013 | Nakai | G06F 1/1626 345/174 |
| 2013/0147793 A1* | 6/2013 | Jeon | G06F 3/011 345/419 |
| 2013/0201136 A1* | 8/2013 | Baard | G06F 3/041 345/173 |
| 2013/0201151 A1* | 8/2013 | Takashima | G06F 3/044 345/174 |
| 2013/0257793 A1* | 10/2013 | Zeliff | G06F 3/044 345/174 |
| 2013/0311938 A1* | 11/2013 | Frazier | G06F 3/044 715/781 |
| 2014/0028554 A1* | 1/2014 | De Los Reyes | G06F 3/04883 345/158 |
| 2014/0152594 A1* | 6/2014 | Kim | G06F 3/04883 345/173 |
| 2014/0218337 A1* | 8/2014 | Yamaguchi | G06F 3/044 345/174 |
| 2014/0232691 A1* | 8/2014 | Lee | G06F 3/044 345/174 |
| 2014/0267078 A1* | 9/2014 | Kukulski | G06F 3/0416 345/173 |
| 2015/0002425 A1* | 1/2015 | Lee | G06F 3/0416 345/173 |
| 2015/0049056 A1* | 2/2015 | Post | G06F 3/046 345/174 |
| 2015/0103043 A1* | 4/2015 | Hills | G06F 3/044 345/174 |

FOREIGN PATENT DOCUMENTS

| | | |
|---|---|---|
| KR | 10-1073309 B1 | 10/2011 |
| KR | 10-2012-0037773 A | 4/2012 |
| KR | 10-2012-0082577 A | 7/2012 |

* cited by examiner

METHOD FOR PROCESSING INPUT AND ELECTRONIC DEVICE THEREOF

CROSS-REFERENCE TO RELATED APPLICATION(S)

This application claims the benefit under 35 U.S.C. § 119(a) of a Korean patent application filed on Jan. 2, 2014 in the Korean Intellectual Property Office and assigned Serial number 10-2014-0000352, the entire disclosure which is hereby incorporated by reference.

TECHNICAL FIELD

The present disclosure relates to an electronic device. More particularly, the present disclosure relates to a method and apparatus for processing an input that is performed through various input means of the electronic device.

BACKGROUND

With the growth of mobile communication technologies, electronic devices are now being used as personal communication devices that are essential to the user. Further, as the electronic devices provide various supplementary services of not only a voice communication function but also a camera function, a data communication function, a video playback function, an audio playback function, a messenger function, a schedule management function, alarm functions and the like, the electronic devices use various programs capable of using the functions, and the user can perform an input to the electronic devices through a variety of input methods or using a diversity of objects.

According to the related art, in identifying an input means of inputting an instruction to an electronic device through a touch screen, the electronic device can directly connect with a specific input means through network communication or by attaching and connecting a peripheral device such as an input device sensing the specific input means with the input means, thereby identifying the input means. In order to identify a plurality of various input means and to input an instruction to the electronic device using the identified input means, there is a need to attach a separate device capable of identifying the respective input means.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus capable of identifying various input means without attaching a separate device capable of identifying the various input means in an electronic device.

Another aspect of the present disclosure is to provide a method and apparatus capable of performing an operation corresponding to an input of an input means pre-registered within a database of an electronic device, without performing a separate setting change in the electronic device.

In accordance with an aspect of the present disclosure, an operation method of an electronic device is provided. The operation method includes, if a 1st input means is positioned in a 1st position spaced apart from a touch screen, acquiring 1st sensing information based on the 1st position, if the 1st input means is positioned in a 2nd position spaced apart from the touch screen, acquiring 2nd sensing information based on the 2nd position, and identifying the 1st input means based on the acquired 1st sensing information and the acquired 2nd sensing information.

According another aspect of the present disclosure, the operation method of the electronic device can further include performing a function corresponding to the identified 1st input means.

According to another aspect of the present disclosure, the function corresponding to the identified 1st input means is one or more of a change of all or some modes that are currently being executed in the electronic device and a change of an effect of displaying, on the touch screen, a direct touch that a user performs to the touch screen with the 1st input means.

According to another aspect of the present disclosure, the 1st sensing information and the 2nd sensing information are acquired by sensing that a user performs an indirect touch input to the touch screen with the 1st input means.

According to another aspect of the present disclosure, the acquiring of the 1st sensing information and the 2nd sensing information comprises acquiring area information of the 1st input means sensed on the touch screen through an electromagnetic field varying in accordance with the indirect touch input.

According to another aspect of the present disclosure, the acquiring of the 1st sensing information and the 2nd sensing information comprises acquiring electromagnetic field variation pattern information sensed on the touch screen by the indirect touch input.

According to another aspect of the present disclosure, the method can further include, if performing a direct touch to the touch screen with the identified 1st input means, performing a function corresponding to the identified 1st input means.

According to another aspect of the present disclosure, the method can further include, if sensing a direct touch of a designated count performed with the identified 1st input means, calling corresponding one or more programs.

According to another aspect of the present disclosure, the method can further include comparing the 1st sensing information and the 2nd sensing information with a plurality of sensing information stored in a database of a memory.

According to another aspect of the present disclosure, the method can further include setting one or more functions to the 1st input means identified based on the plurality of sensing information stored in the database of the memory.

According to another aspect of the present disclosure, the plurality of sensing information can include one or more of electromagnetic field information, electromagnetic field area information, and area information of the 1st input means sensed on the touch screen.

According to another aspect of the present disclosure, the 1st sensing information and the 2nd sensing information can be one or more of electromagnetic field information, electromagnetic field area information, and area information of the 1st input means sensed on the touch screen.

According to another aspect of the present disclosure, the method can further include, if a 2nd input means is positioned in a 3rd position spaced apart from a touch screen, acquiring 3rd sensing information based on the 3rd position, if the 2nd input means is positioned in a 4th position spaced apart from the touch screen, acquiring 4th sensing information based on the 4th position, and identifying the 2nd input means based on the acquired 3rd sensing information and the acquired 4th sensing information.

According to another aspect of the present disclosure, the method can further include performing an indirect touch to a designated position of the touch screen with one or more of the 1st input means and the 2nd input means, and, in response to the indirect touch, calling designated one or more programs of the electronic device or displaying a list of the designated one or more programs on the touch screen.

According to another aspect of the present disclosure, the method can further include performing respective functions corresponding to the identified 1st input means and the identified 2nd input means.

According to another aspect of the present disclosure, the method can further include performing an input with the 1st input means and the 2nd input means, and performing a function corresponding to the input.

According to another aspect of the present disclosure, the 1st input means and the 2nd input means can be registered to a database.

According to another aspect of the present disclosure, the performing of the input can include performing the input concurrently with the 1st input means and the 2nd input means.

According to another aspect of the present disclosure, the method can further include performing an indirect touch with the 1st input means and the 2nd input means, and performing an instruction corresponding to the indirect touch.

In accordance with another aspect of the present disclosure, an operation method of an electronic device is provided. The operation method includes, if a 1st input means is positioned in a 1st position spaced apart from a touch screen, acquiring 1st sensing information of the 1st position, if the 1st input means is positioned in a 2nd position spaced apart from the touch screen, acquiring 2nd sensing information of the 2nd position, and identifying the 1st input means based on the acquired 1st sensing information and the acquired 2nd sensing information.

In accordance with another aspect of the present disclosure, an electronic device is provided. The electronic device includes a processor, a memory connected with the processor, and a touch screen connected with the processor. The processor and the memory can be programmed to, if a 1st input means is positioned in a 1st position spaced apart from a touch screen, acquire 1st sensing information based on the 1st position, if the 1st input means is positioned in a 2nd position spaced apart from the touch screen, acquire 2nd sensing information based on the 2nd position, and identify the 1st input means based on the acquired 1st sensing information and the acquired 2nd sensing information.

According to another aspect of the present disclosure, the processor and the memory can be further programmed to, if a 2nd input means is positioned in a 1st position, acquire 3rd sensing information of the 3rd position, if the 2nd input means is positioned in a 4th position, acquire 4th sensing information of the 4th position, and identify the 2nd input means based on the acquired 3rd sensing information and the acquired 4th sensing information.

According to another aspect of the present disclosure, the processor and the memory can be further programmed to perform one or more of a change of all or some modes currently being executed in the electronic device and a change of an effect of displaying, on the touch screen, a direct touch that a user performs to the touch screen with the identified 1st input means.

According to another aspect of the present disclosure, the processor and the memory can be further programmed to perform a function corresponding to the identified 1st input means.

According to another aspect of the present disclosure, if performing a direct touch to the touch screen with the identified 1st input means, the processor and the memory can be further programmed to perform a function corresponding to the identified 1st input means.

According to another aspect of the present disclosure, if sensing a plurality of input means on the touch screen, the processor and the memory can be further programmed to perform respective functions corresponding to the sensed plurality of input means.

According to another aspect of the present disclosure, the processor and the memory can be further programmed to sense a gesture inputted concurrently with the sensed plurality of input means, and perform a function corresponding to the gesture.

According to another aspect of the present disclosure, if sensing a direct touch of a designated count performed with the sensed plurality of input means, the processor and the memory can be further programmed to call corresponding one or more programs.

According to another aspect of the present disclosure, if one or more of the sensed plurality of input means and the 1st input means perform an indirect touch to a designated region of the touch screen, the processor and the memory can be further programmed to call designated one or more programs of the electronic device or display a list of the designated one or more programs on the touch screen, in response to the indirect touch.

In accordance with another aspect of the present disclosure, a non-transitory computer-readable recording medium having a database and a program recorded thereon is provided. The program causing a computer to execute a method including acquiring at least one sensing information, determining, in accordance with the database, an operation mode of the electronic device in response to the at least one sensing information, if a 1st input means is positioned in a 1st position spaced apart from a touch screen, acquiring 1st sensing information based on the 1st position, if the 1st input means is positioned in a 2nd position spaced apart from the touch screen, acquiring 2nd sensing information based on the 2nd position, and identifying the 1st input means based on the acquired 1st sensing information and the acquired 2nd sensing information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
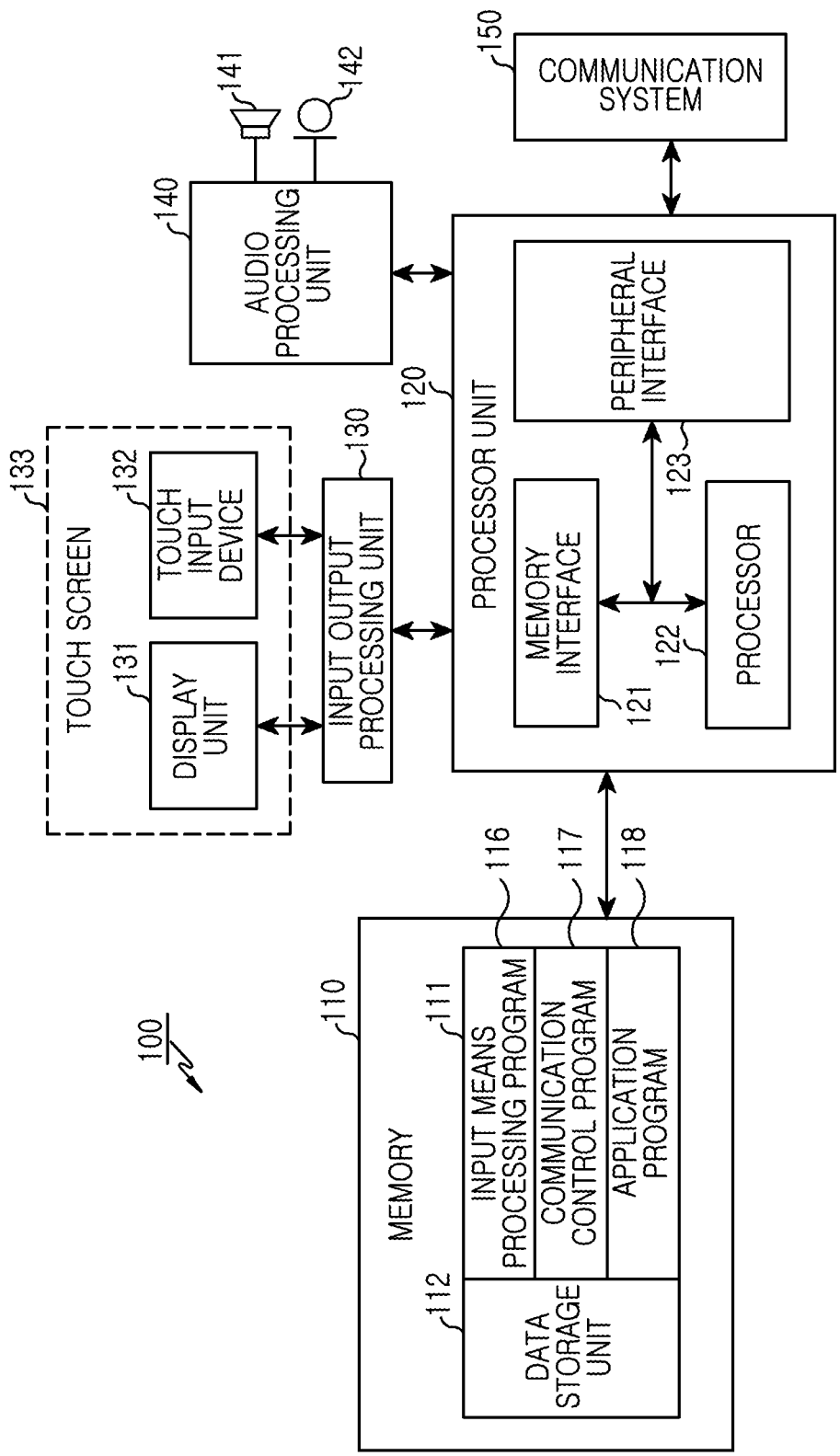
FIG. 1 is a block diagram illustrating a construction of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing various embodiments of the present disclosure, an electronic device can be described based on a touch screen in which an input process of an input device and a display process of a display unit can be performed using one physical screen. Accordingly, although the display unit and the input device are separately illustrated in a device construction of the present disclosure, the display unit can be illustrated to include the input device or the display unit can be illustrated as the input device.

The present disclosure is not limited only to an electronic device with a touch screen, and will be applicable to various electronic devices physically dividing a display unit and an input device or including only one of the display unit and the input device. In various embodiments of the present disclosure below, the electronic device with the touch screen can be an electronic device including a touch screen which includes a touch input device and a display unit, a display unit not including a touch input device, or a display unit including a touch input device.

In the following description, an electronic device includes a mobile communication terminal, a Personal Digital Assistant (PDA), a Personal Computer (PC), a laptop, a smartphone, a smart Television (TV), a netbook, a Mobile Internet Device (MID), an Ultra Mobile PC (UMPC), a tablet PC, a mobile pad, a media player, a handheld computer, a navigator, a smart watch, a Head-Mounted Device (HMD), an MPEG Audio Layer 3 Player (MP3P), and the like.

In a detailed description of the present disclosure below, when it is mentioned that any constituent element is 'connected' or 'accessed' to another constituent element, it should be understood that any constituent element can be directly connected or accessed to the another constituent element or the third constituent element can exist between the two constituent elements. In contrast, when it is mentioned that any constituent element is 'directly connected' or 'directly accessed' to another constituent element, it should be understood that the third constituent element does not exist between the two constituent elements.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a construction of an electronic device according to an embodiment of the present disclosure.

Referring to FIG. 1, an electronic device 100 is illustrated, where the electronic device 100 includes a memory 110 and a processor unit 120, and can include peripheral devices such as an input output processing unit 130, a touch screen 133 including a display unit 131 and a touch input device 132, an audio processing unit 140, a communication system 150, and other peripheral devices.

Each constituent element is described as follows.

The memory 110 includes a program storage unit 111 storing a program for controlling an operation of the electronic device 100 and a data storage unit 112 storing data generated during program execution. The memory 110 can store data generated by the program during an operation of a processor 122 of the processing unit 120.

In processing data of the program in the electronic device 100, the data storage unit 112 can store a function of the program, an object of the program, a keyword, an IDentification (ID) code, and information of the peripheral devices of the electronic device 100 usable by the program.

In an embodiment of the present disclosure, if converting a voice of multimedia data into a text, the electronic device 100 can store the converted text data. If selecting a part of the text and determining some voice data corresponding to the selected text part, the electronic device 100 can store the some voice data.

The program storage unit 111 can include an input means processing program 116, a communication control program 117, and at least one application program 118. The programs included in the program storage unit 111 can be also configured as a set of instructions and can be expressed as an instruction set.

The input means processing program 116 can define and register an identification code of an input means in a setting menu, and can acquire information capable of identifying the input means through an indirect touch input, and can set an operation corresponding to an input of the input means to build a database of the electronic device 100.

If a user inputs an instruction through an indirect touch input or a direct touch input with an input means registered to the database of the electronic device 100, the input means processing program 116 can acquire information of the input means through the indirect touch input, and can determine an identification code of the input means corresponding to the acquired information of the input means with reference to the database of the electronic device 100.

If the user intends to input an instruction to the electronic device 100 with the input means pre-registered to the database of the electronic device 100, the input means processing program 116 can perform a gesture and input the instruction without separate setting change. The input means processing program 116 can identify the input means inputting the gesture with reference to the database of the electronic device 100, and can perform the instruction corresponding to the gesture.

The communication control program 117 can include at least one software constituent element for controlling communication with at least one counterpart electronic device using the communication system 150.

In an embodiment of the present disclosure, the communication control program 117 can search a counterpart electronic device for connecting communication. If the counterpart electronic device for the communication connection is searched, the communication control program 117 can set a communication connection with the counterpart electronic device. The communication control program 117 can control to perform a performance search and session establishment procedure with the connected counterpart electronic device and transmit/receive data with the counterpart electronic device through the communication system 150.

The application program 118 can include a software constituent element for at least one application program installed in the memory 110 of the electronic device 100.

The memory 110 of the electronic device 100 can be constructed as one or more memory units. According to an embodiment of the present disclosure, the memory 110 can perform a function of only the program storage unit 111, or can perform a function of only the data storage unit 112, or can perform the functions of all of them in accordance to a use. Because of a characteristic of the electronic device 100, the memory 110 may not be constructed to make physical region division within the memory 110 clear.

The processor unit 120 includes a memory interface 121, at least one processor 122, and a peripheral interface 123. Here, the memory interface 121, the at least one processor 122, and the peripheral interface 123, which are included in the processor unit 120, can be integrated as at least one circuit or be implemented as separate constituent elements.

The memory interface 121 can control the access of the constituent element such as the processor 122 or the peripheral interface 123 to the memory 110.

The peripheral interface 123 can control the connection of the memory interface 121 and the processor 122 with an input output peripheral device of the electronic device 100.

The processor 122 can control the electronic device 100 to provide various multimedia services using at least one software program and display a User Interface (UI) operation of the electronic device 100 on the display unit 131 through the input output processing unit 130, such that a user checks the UI operation. The processor 122 can control the electronic device 100 to provide a service of receiving an instruction from the external of the electronic device 100 through the input device 132. The processor 122 can control to execute at least one program stored in the memory 110 and provide a service corresponding to the corresponding program.

The input output processing unit 130 can provide an interface between the peripheral interface 123 and the input output device (i.e., the touch screen) 133 including the display unit 131 and the input device 132.

The display unit 131 can configure and display a UI operation by receiving status information of the electronic device 100, characters inputted from the external, a moving picture, or a still picture from the processor unit 120 through the input output processing unit 130.

The input device 132 can provide input data generated by user's selection, to the processor unit 120 through the input output processing unit 130.

For example, the input device 132 can be comprised of only a control button or be also comprised of a keypad in order to receive data for control from the external of the electronic device 100.

According to an embodiment of the present disclosure, the input device 132 can be included together in the display unit 131 like the touch screen 133 capable of concurrently performing input and output. Accordingly, the input device 132 used for the touch screen 133 can use one or more of a capacitive overlay method, a resistance overlay (pressure sensitive) method, an infrared beam method, an electronic inductive method, and an acoustic wave method.

According to an embodiment of the present disclosure, an input method of the input device 132 of the touch screen 133 can be a method of inputting an instruction when an object for inputting is positioned within a certain distance from the touch screen 133, besides a method of performing a direct touch to the touch screen 133 and performing input to the touch screen 133. The terms of a hovering or floating touch, an indirect touch, a proximity touch, and a non-contact input can be used.

An input/output device (i.e., the touch screen) 133, a device physically combining the display unit 131 and the input device 132, can be a touch screen capable of inputting an instruction by touching a screen object displayed on the display unit 131 in an operation of the electronic device 100.

Accordingly, the touch screen 133 can perform all of the roles of the display unit 131 displaying the UI operation of the electronic device 100 and the input device 132 inputting an external instruction to the electronic device 100. Therefore, the touch screen 133 can be constructed including the display unit 131 and the input device 132 in the following description.

The audio processing unit 140 can provide an audio interface between a user and the electronic device 100 through a speaker 141 and a microphone 142.

The communication system 150 performs a telecommunication function. The communication system 150 can perform communication with the counterpart electronic device using at least any one of mobile communication communicating with a base station, Infrared Data Association (IrDA) communication, Bluetooth (BT) communication, Bluetooth Low Energy (BLE) communication, Wireless-Fidelity (Wi-Fi) communication, Near Field Communication (NFC), short-range wireless communication such as Zigbee and Wireless Local Area Network (WLAN) communication, and wired communication.

In describing an embodiment of the present disclosure, displaying by the electronic device 100 or outputting by the electronic device 100 can be the terms defining a method of displaying a moving picture, a still picture, or a Graphic User Interface (GUI) operation on the touch screen 133 of the electronic device 100 or outputting a signal sound or voice audio to the speaker 141. In the following description, the term of displaying or outputting can be used as the similar meaning as well. The terms can be described separately if division is needed.

Figure 2:
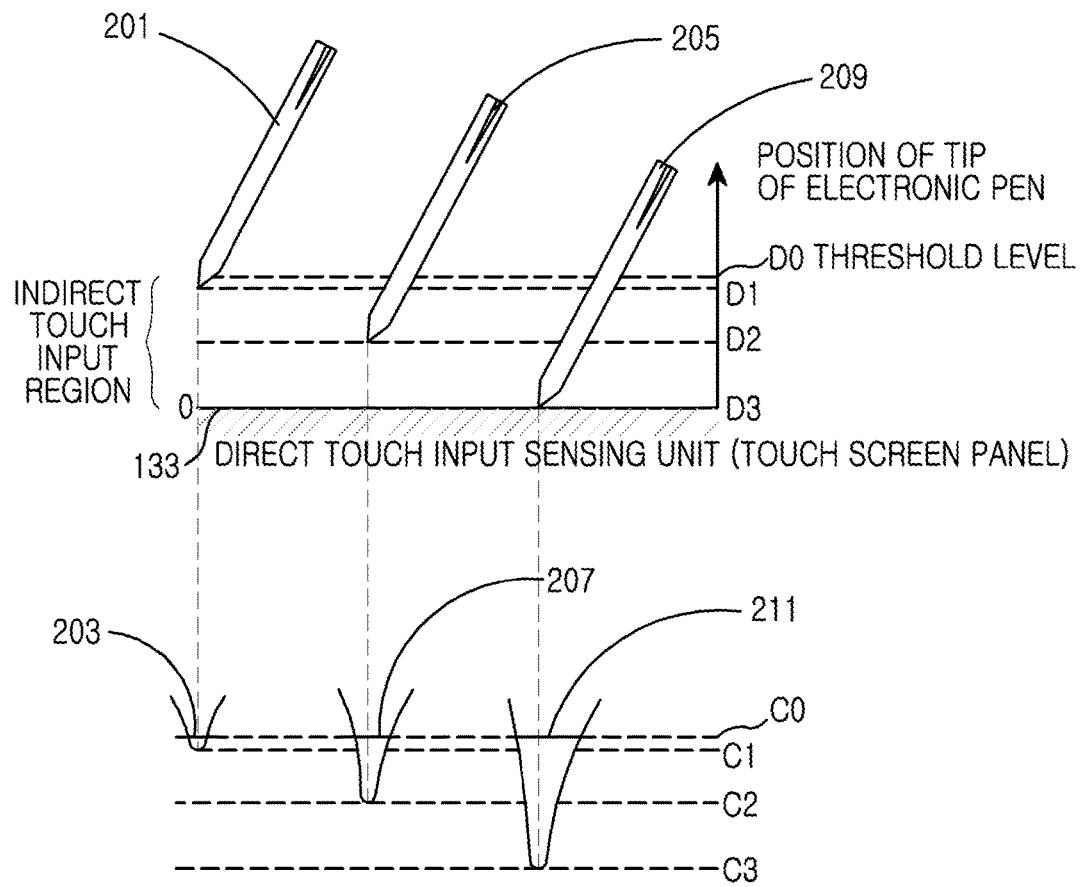
FIG. 2 is a diagram illustrating input sensing corresponding to an input means of an electronic device according to an embodiment of the present disclosure.

FIG. 2 is a diagram illustrating input sensing corresponding to an input means of an electronic device according to an embodiment of the present disclosure.

Referring to FIG. 2, if an input means approaches a touch screen 133, then an electronic device 100 (see FIG. 1) can sense the input means through the touch screen 133. The electronic device 100 can configure a transmission and reception channel in an electrode of a capacitive overlay touch screen panel, and can apply a voltage to the configured transmission/reception channel to form an electromagnetic field region capable of sensing an indirect touch. Through a variation of capacitance of the electronic device 100, the electronic device 100 can sense a variation of the electromagnetic field region generated when the input means approaches the touch screen 133. Based on the capacitance variation, the electronic device 100 can determine an area of the input means of a threshold level to determine a form of the input means, and can identify the input means in accordance to the form of the input means. The area of the input means determining the form of the input means can be a cross section of the input means corresponding to a capacitance value of the electronic device 100 based on the capacitance variation or can be an area of an orthograph formed by the input means in a reference position (e.g., the threshold level). In identifying the input means based on the determined area, the electronic device 100 can identify the input means based on a plurality of determined area information of the input means.

Upon indirect touch input, the electronic device 100 can induce a variation of an electromagnetic field region formed within an indirect touch input sensing range of the touch screen 133 through the input means positioned within the indirect touch input sensing range of the touch screen 133, and measure the variation of the electromagnetic field region by a variation of a capacitance value of the electronic device 100. Accordingly, the electronic device 100 will be able to find an electromagnetic field region value in the capacitance value. In the following description, the electromagnetic field region can be described as 'capacitance'.

The electronic device 100 can define a threshold level as a position forming a specific electromagnetic field region (i.e., specific capacitance) in the touch screen panel. If the input means gets closer to a touch screen from the specific electromagnetic field region of the threshold level, the electronic device 100 can process that the input means inputs an instruction.

The electronic device 100 can define an electromagnetic field region D0, i.e., a position of the threshold level, and can define capacitance C0 corresponding to the threshold level. The electronic device 100 can define a position of the electromagnetic field region based on the capacitance.

The electronic device 100 can use a touch pen as an input means for indirect touch. If an indirect touch sensing intensity (i.e., an electromagnetic field region value sensed by a reception channel of the touch screen panel) reaches the threshold level by making the touch pen approach the touch screen 133 of the electronic device 100, then the electronic device 100 can process a variation of capacitance of the threshold level caused by the touch pen or a tip (i.e., a device positioned at an end of the touch pen and capable of changing capacitance) of the touch pen and can determine an area of the touch pen of the threshold level through data of the varied capacitance.

According to an embodiment of the present disclosure, the electronic device 100 is not limited to sensing the capacitance variation caused by the tip of the touch pen, and can sense even a variation of capacitance caused by parts other than the tip of the touch pen. The electronic device 100 can also get an area of the touch pen of the threshold level through data of the capacitance variation caused by the parts other than the tip of the touch pen.

For example, referring to FIG. 2, by making a tip of a touch pen 201 pass a threshold level (i.e., electromagnetic field region D0 and capacitance C0 in position) on the touch screen panel, the tip of the touch pen 201 can be positioned in an electromagnetic field region D1. The electromagnetic field region D1 can correspond to capacitance C1. The electronic device 100 can sense that the capacitance C1 is varied, and can determine capacitance data 203 varying at the electromagnetic field region D0 of a time point from which the capacitance C1 is varied. Through the determined capacitance data 203, the electronic device 100 can get an area of the touch pen 201 at the electromagnetic field region D0 of the time point from which the capacitance C1 is varied.

In a similar method, by moving the tip of the touch pen 205 closer to the touch screen 133, the tip of the touch pen 205 can be positioned in an electromagnetic field region D2. The electromagnetic field region D2 can correspond to capacitance C2. The electronic device 100 can sense that the capacitance C2 is varied, and can determine capacitance data 207 varying at the electromagnetic field region D0 (i.e., the threshold level) of a time point from which the capacitance C2 is varied. Through the determined capacitance data 207, the electronic device 100 can get an area of the touch pen 205 at the electromagnetic field region D0 of the time point from which the capacitance C2 is varied.

In a similar method, by moving the tip of the touch pen 209 closer to the touch screen 133 or making the tip of the touch pen 209 touch the touch screen 133, the tip of the touch pen 209 can be positioned in an electromagnetic field region D3. The electromagnetic field region D3 can correspond to capacitance C3. The electronic device 100 can sense that the capacitance C3 is varied, and can determine capacitance data 211 varying at the electromagnetic field region D0 of a time point from which the capacitance C3 is varied. Through the determined capacitance data 211, the electronic device 100 can get an area of the touch pen 209 at the electromagnetic field region D0 of the time point from which the capacitance C3 is varied.

In getting the area of the touch pen, the electronic device 100 may not be limited to getting the area of the touch pen of the electromagnetic field region D0 by measuring a variation of the capacitance C0 of the threshold level.

If the tip of the touch pen is positioned in the electromagnetic field region D3, the electronic device 100 not only gets the area of the touch pen at the electromagnetic field region D0 by measuring a variation of the capacitance C0 corresponding to the electromagnetic field region D0, but also can get an area of the touch pen at the electromagnetic field region D1 by measuring a variation of the capacitance C1 corresponding to the electromagnetic field region D1, or can get an area of the touch pen at the electromagnetic field region D2 by measuring a variation of the capacitance C2 corresponding to the electromagnetic field region D2, or can get all of the areas of the touch pen at the electromagnetic field region D0, the electromagnetic field region D1, and the electromagnetic field region D2.

With reference to the aforementioned two or more areas, the electronic device 100 can determine a feature of the touch pen. Through the determined two or more areas, the electronic device 100 can identify the touch pen performing the indirect touch input to the touch screen 133 of the electronic device 100.

In identifying the input means through the determined two or more areas, the electronic device 100 can identify the input means with reference to the determined two or more area information and previously stored area information of a database of the memory of the electronic device 100. The electronic device 100 can identify the input means with reference to an acquired area variation quantity and area variation quantity information of the database.

According to an embodiment of the present disclosure, in identifying (determining) the input means, the electronic device 100 may not be limited to identifying the input means through the acquired area of the touch pen. In measuring the capacitance C0 corresponding to the electromagnetic field region D0, the electronic device 100 can acquire variation information of the capacitance C0, and can acquire capacitance variation pattern information based on the capacitance C0. The electronic device 100 may acquire a variation quantity of the variation information of the capacitance C0 and/or the capacitance variation pattern information. Based on a variation of the capacitance C0 acquired corresponding to a variation of various electromagnetic field regions D0, D1, D2, and D3, the electronic device 100 may acquire a form of the input means to identify the input means.

According to an embodiment of the present disclosure, sensing an input means (e.g., a touch pen or a finger) through the touch screen 133 of the electronic device 100 can be described based on the electromagnetic field regions D0, D1, D2, and D3 and the capacitance C0, C1, C2, and C3, and it is not limited to this. In sensing the input means of the electromagnetic field region, when it is defined that positioning the tip of the touch pen in the electromagnetic field region D3 (i.e., the corresponding capacitance C3) is touching the touch screen 133, the electronic device 100 is not limited to sensing the input means at the two electromagnetic field regions D1 and D2 between the electromagnetic field region D0 (i.e., the corresponding capacitance C0) and the electromagnetic field region D3 (i.e., the corresponding capacitance C3), and can also sense the input means at three or more electromagnetic field regions. In identifying the input means in an indirect touch region of the touch screen 133, when sensing the input means at the three or more electromagnetic field regions, the electronic device 100 can also measure capacitance corresponding to the three or more electromagnetic field regions. Also, it can be applied to various embodiments of the present disclosure in a similar manner.

Figure 3:
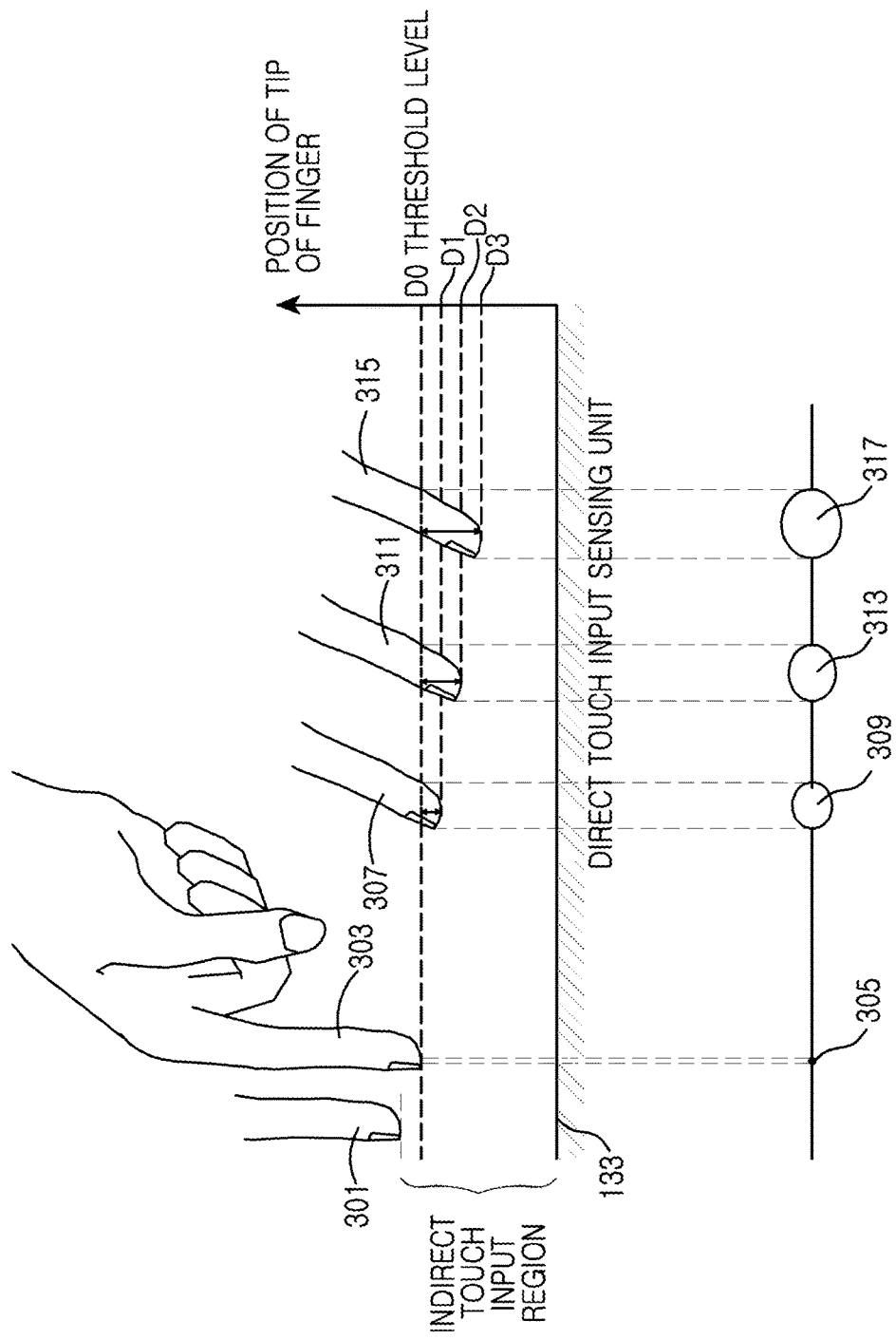
FIG. 3 is a diagram illustrating input sensing corresponding to an input means of an electronic device according to an embodiment of the present disclosure.

FIG. 3 is a diagram illustrating input sensing corresponding to an input means of an electronic device according to an embodiment of the present disclosure.

Referring to FIG. 3, an electronic device 100 of FIG. 1 can use a finger as an input means for indirect touch. If the finger approaches a touch screen 133 of the electronic device 100 (see FIG. 1) and a senses intensity (i.e., a capacitance value sensed in a reception channel of a touch screen panel) of the indirect touch reaches a threshold level, then the electronic device 100 can process a capacitance variation of the threshold level caused by a tip of the finger, and can determine an area of the finger of the threshold level through data of the varied capacitance.

For example, referring to FIG. 3, when the position 301 of the tip of the finger is farther than the threshold level (i.e., the electromagnetic field region D0) from the touch screen panel, the electronic device 100 can sense a capacitance variation caused by the finger, if the position 301 of the tip of the finger is within an indirect touch sensible range of the touch screen panel. The electronic device 100 can be defined to measure a capacitance variation caused by the finger positioned closer than the threshold level to the touch screen panel. Accordingly, it can be a state where the electronic device 100 senses the capacitance variation caused by the finger but not processing to input an instruction.

The electronic device 100 can process not to input an instruction in response to a capacitance variation occurring in a range outside the threshold level from the touch screen 133, with respect to not only the finger but also the touch pen described in FIG. 2 and various input means.

The tip of the finger can be positioned in operation 303 at the threshold level (i.e., the electromagnetic field region D0) on the touch screen panel, and the electromagnetic field region D0 can correspond to a capacitance C0 illustrated in FIG. 2. The electronic device 100 can sense that the capacitance C0 is varied, and can determine capacitance data varying at a time point from which the capacitance C0 is varied. Through the capacitance data, the electronic device 100 can determine an area 305 of the finger at the electromagnetic field region D0 corresponding to the variation of the capacitance C0.

By making the tip of the finger pass the threshold level set on the touch screen panel, the tip of the finger can be positioned in operation 307 in an electromagnetic field region D1. The electromagnetic field region D1 can correspond to a capacitance C1 as illustrated in FIG. 2. The electronic device 100 can sense that the capacitance C1 is varied, and can determine capacitance data varying at the electromagnetic field region D0 of a time point from which the capacitance C1 is varied. Through the determined capacitance data, the electronic device 100 can get an area 309 of the finger at the electromagnetic field region D0 of the time point from which the capacitance C1 is varied.

In a similar method, by making the tip of the finger pass the threshold level set on the touch screen panel, the tip of the finger can be positioned in operation 311 in an electromagnetic field region D2. The electromagnetic field region D2 can correspond to capacitance C2. The electronic device 100 can sense that a capacitance C2 as illustrated in FIG. 2 is varied, and can determine capacitance data varying at the electromagnetic field region D0 of a time point from which the capacitance C2 is varied. Through the determined capacitance data, the electronic device 100 can get an area 313 of the finger at the electromagnetic field region D0 of the time point from which the capacitance C2 is varied.

In a similar method, by moving the tip of the finger closer to the touch screen 133 or making the tip of the finger touch the touch screen 133, the tip of the finger can be positioned in operation 315 in an electromagnetic field region D3. The electromagnetic field region D3 can correspond to a capacitance C3 as illustrated in FIG. 2. The electronic device 100 can sense that the capacitance C3 is varied, and can determine capacitance data varying at the electromagnetic field region D0 of a time point from which the capacitance C3 is varied. Through the determined capacitance data, the electronic device 100 can get an area 317 of the finger at the electromagnetic field region D0 of the time point from which the capacitance C3 is varied.

In getting the area of the finger, the electronic device 100 may not be limited to getting the area of the finger by measuring a variation of the capacitance C0 corresponding to the electromagnetic field region D0 of the threshold level.

If the finger is positioned as denoted by operation 315, the capacitance C3 corresponding to the electromagnetic field region D3 can be varied, because the tip of the finger is positioned in the electromagnetic field region D3. The electronic device 100 can not only get an area of the finger of the electromagnetic field region D0 by measuring a variation of the capacitance C0 corresponding to the electromagnetic field region D0 of a time point from which the capacitance C3 is varied, but also can get an area of the finger at the electromagnetic field region D1 by measuring a variation of the capacitance C1 corresponding to the electromagnetic field region D1, or can also get an area of the finger at the electromagnetic field region D2 by measuring a variation of the capacitance C2 corresponding to the electromagnetic field region D2, or can also get an area of the finger at the electromagnetic field region D3 by measuring a variation of the capacitance C3 corresponding to the electromagnetic field region D3. According to an embodiment, the electronic device 100 can not only get the area of the finger at the electromagnetic field region D0 by measuring the variation of the capacitance C0 corresponding to the electromagnetic field region D0, but also can get two or more of them or all.

Referring to operations 303 and 305 of FIG. 3, if a tip of a touch pen or a tip of a finger is positioned in an electromagnetic field region D0 being a threshold level of an indirect touch region, the electronic device 100 can get an area of the touch pen or an area of the finger at the electromagnetic field region D0 by measuring a variation of the capacitance C0. The areas of the finger and the touch pen of the electromagnetic field region D0 can be the same or similar with each other. If so, the electronic device 100 cannot distinguish whether an input means positioned in the indirect touch region is the touch pen or the finger, through the areas of the finger and the touch pen of the electromagnetic field region D0.

The electronic device 100 can determine a feature of the touch pen with reference to two or more areas and can define an identification of the touch pen. If the input means is positioned within the threshold level of the indirect touch region of the touch screen 133 of the electronic device 100, the electronic device 100 can identify the input means performing an input through the decided two or more areas.

Figure 4A:
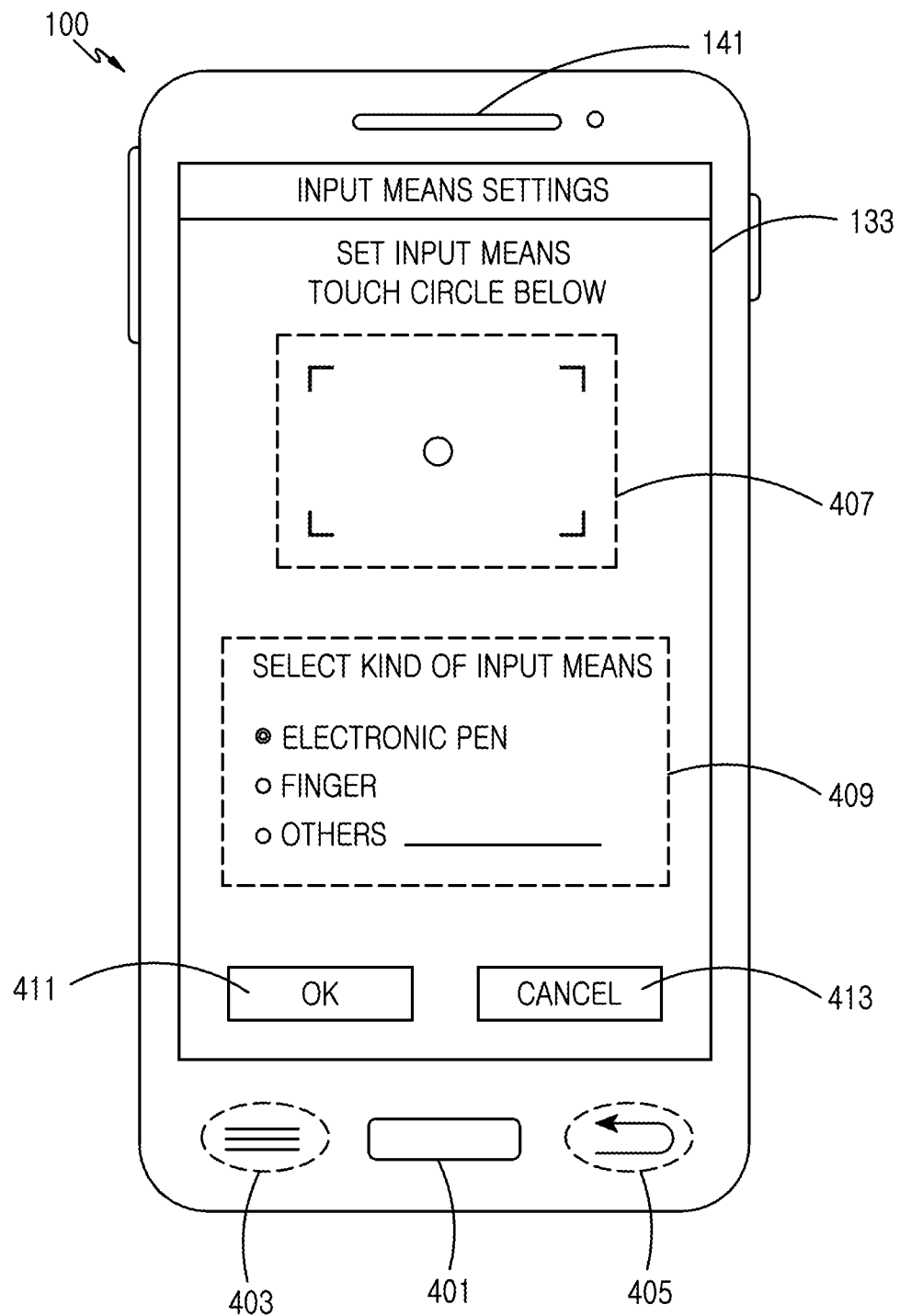
FIGS. 4A and 4B are diagrams illustrating an operation of setting an input means of an electronic device according to various embodiments of the present disclosure.

FIG. 4A illustrates an operation of setting an input means of an electronic device according to an embodiment of the present disclosure.

Referring to FIG. 4A, an electronic device 100 including a touch screen 133 in a front part thereof is illustrated. The touch screen 133 can include an input device 132, as illustrated in FIG. 1, for inputting an instruction by performing a gesture with an input means to a display unit 131, as illustrated in FIG. 1, capable of displaying the content of an operation of the electronic device 100 through a UI.

According to an embodiment of the present disclosure, the electronic device 100 can combine an input means and a touch button or physical button of the electronic device 100 to make the input means perform an indirect touch gesture through an operation corresponding to a touch pattern at a distance from the touch screen 133.

Undoubtedly, the gesture can include an input capable of being generated on the touch screen 133, such as swipe, pinch, flick, and the like, besides the aforementioned inputs.

The electronic device 100 can include a speaker 141 capable of outputting a sound at its upper side. The electronic device 100 can include a button 401, one of input devices capable of inputting an instruction by a click, at its lower side, and can include a touch button 403 or 405 capable of inputting an instruction through a touch at a fixed position. The electronic device 100 can include the speaker 141, the button 401, or the touch button 403 or 405 in the same position or different positions, though the speaker 141, the button 401, or the touch button 403 or 405 is not illustrated.

The electronic device 100 can provide a menu capable of registering and/or setting an input means. Through an operation of setting the input means, the electronic device 100 can measure a capacitance variation caused by the input means. In accordance with a characteristic of the capacitance variation, the electronic device 100 can define an identification code of the input means, and can set a representative operation of the input means.

Referring to FIG. 4A, the electronic device 100 can provide a region 407 for inputting an instruction of an input means through the touch screen 133 capable of inputting an indirect touch instruction.

The electronic device 100 can provide the touch screen 133 with a region for measuring a capacitance variation caused by the input means in accordance with an indirect touch input motion of the input means, in a setting menu of an input means processing program 116 as illustrated in FIG. 1. Referring to FIGS. 3 and 4A, if a user touches a circle of the region 407 displayed on the touch screen 133 with the input means, the electronic device 100 can measure a capacitance variation caused by the input means when the input means is positioned in a position (or an electromagnetic field region) of a defined value from a touch screen panel. With reference to the measured capacitance variation, the electronic device 100 can acquire an area of the input means varying capacitance. The electronic device 100 can define the acquired area as an area of the input means, and can store the acquired area in a database including two or more area information to identify the input means.

In identifying the input means through decided two or more areas, the electronic device 100 can identify the input means with reference to decided two or more area information and area information of the database of the memory of the electronic device 100. The electronic device 100 can store corresponding information in the database to identify the input means with reference to an acquired area variation quantity and area variation quantity information of the database.

According to an embodiment of the present disclosure, in identifying (determining) the input means, the electronic device 100 may not be limited to identifying the input means through the acquired area of the touch pen. In measuring a capacitance C0, as illustrated in FIG. 2, corresponding to an electromagnetic field region D0, the electronic device 100 can acquire variation information of the capacitance C0. Based on the capacitance C0, the electronic device 100 can acquire capacitance variation pattern information. The electronic device 100 can acquire a variation quantity of the variation information of the capacitance C0 and/or the capacitance variation pattern information, and can acquire a form of the input means based on a variation of the capacitance C0 acquired corresponding to a variation of various electromagnetic field regions D0, D1, D2, and D3. The electronic device 100 can store the acquired information in the database and use the stored information as information capable of identifying the input means.

The electronic device 100 can give the input means an identification code capable of identifying the input means, and can provide a menu 409 capable of determining the kind of the input means. The electronic device 100 can provide an okay menu 411 (i.e., an icon) capable of storing in the database information about the input means which is set in an input means registration step of the input means processing program 116, and can provide a cancel menu 413 (i.e., icon) capable of deleting the information about the input means without storing.

In the operation of setting the input means, the electronic device 100 is not limited to deciding the kind of the input means, and can also provide, though not illustrated, a menu of setting a representative function which can be basically provided without particular setting change when a user inputs an instruction with the set input means.

Figure 4B:
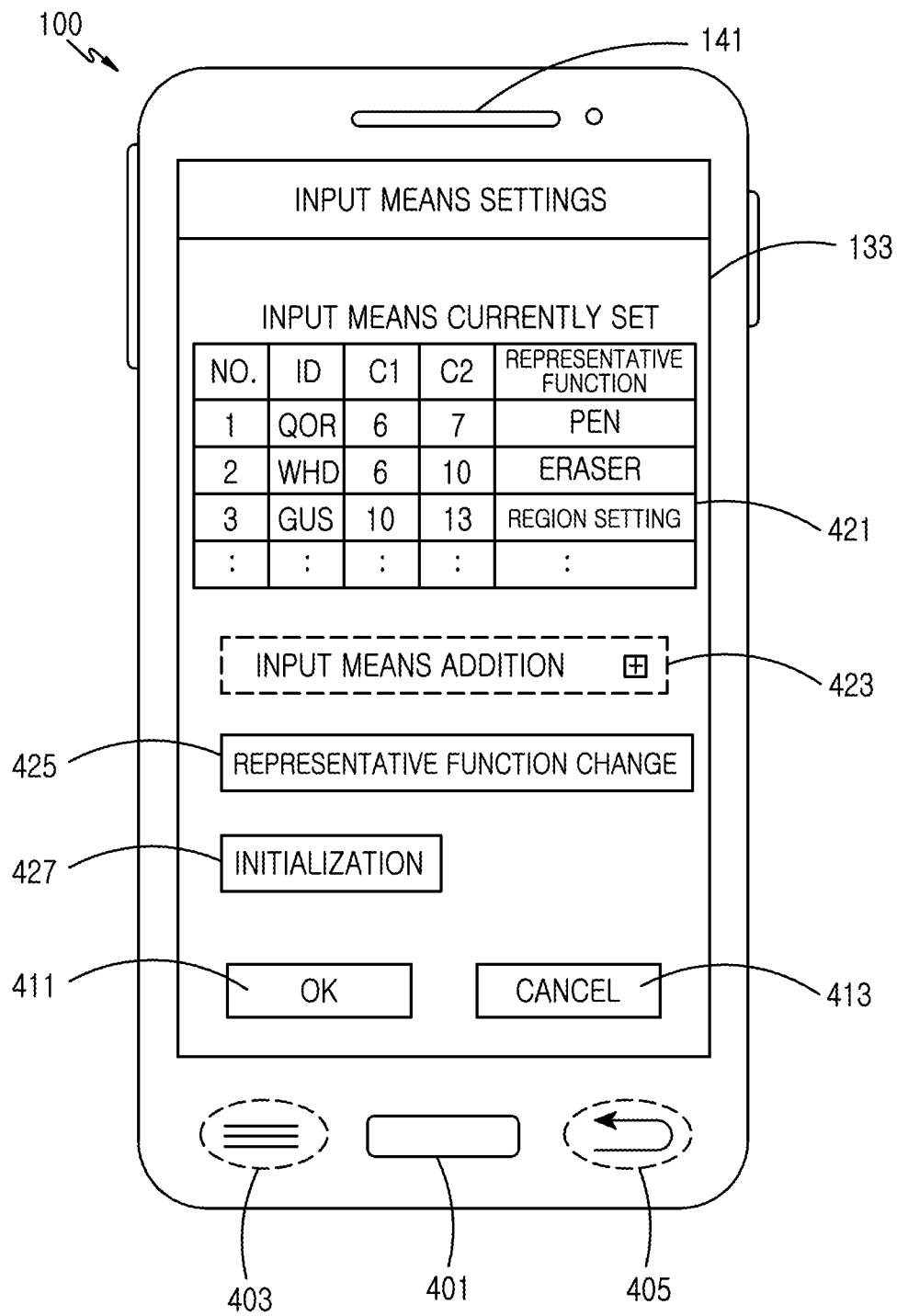

FIG. 4B illustrates an operation of setting an input means of an electronic device according to an embodiment of the present disclosure.

Referring to FIG. 4B, an electronic device 100 can define and register identification codes to various input means, and can build a database having data that are information about the input means, and can provide a menu of changing a representative function of each input means, and can provide a menu of additionally registering the input means, and can provide a menu of initializing the registered input means.

Referring to FIG. 4B, the electronic device 100 can confirm information of a registered input means through a touch screen 133. The electronic device 100 can store in the database various information of the input means which are decided through the input means registration method aforementioned in FIG. 2 or 3.

In an embodiment of the present disclosure, the electronic device 100 can provide a menu of confirming information about an input means which is registered through an input means processing program 116 as illustrated in FIG. 1. The electronic device 100 can display a data table 421 including information of one or more registered input means, on the touch screen 133.

Referring to the data table 421, the electronic device 100 can display the information about the registered input means, such as the number (No.) of the registered input means, an identification code (ID) of the registered input means, an area of the input means decided through a capacitance variation of a threshold level C0 of the moment from which capacitance C1 is varied, an area of the input means decided through a capacitance variation of the threshold level C0 of the moment from which capacitance C2 is varied, and/or a representative function which can be basically provided without particular setting change when a user inputs an instruction with the input means. The information 421 stored in the database can be information about an input means acquired through a region 407 as illustrated in FIG. 4A.

Referring to the data table 421, when a user performs a gesture to the touch screen 133 of the electronic device 100 with an input means WHD, a tip of the input means WHD can pass the threshold level C0 and reach the capacitance C1, varying the capacitance C1. At this time, an area of the input means WHD can be decided '6' due to the variation of the capacitance C1. Referring to the input means database stored in the memory of the electronic device 100, an area of an input means QOR can be decided '6' due to a capacitance variation of the threshold level C0 of the moment from which capacitance C1 of the input means QOR is varied. The capacitance C1 of the input means WHD can be equal to '6' as well. Therefore, the electronic device 100 cannot identify the input means QOR and the input means WHD through the capacitance C1.

The electronic device 100 can determine the area of the input means WHD as '10', through a capacitance variation of the capacitance C0 of the moment from which a tip of the input means WHD passes the capacitance C1 and reaches the capacitance C2 to vary the capacitance C2. The electronic device 100 can determine that an input means is the input means WHD. If a user performs a gesture with the input means WHD with touching and holding the touch screen 133 without particular setting, the electronic device 100 can perform an operation corresponding to the gesture in accordance to information set to the database.

In an embodiment of the present disclosure, if an eraser function is set as a representative function of the input means WHD and a user performs an operation of dragging with touching and holding a certain region of the touch screen 133 with the input means WHD during an operation of a program of drawing a painting, the electronic device 100 can delete a portion corresponding to the dragged region.

The electronic device 100 can provide a menu 423 capable of registering a new input means. The electronic device 100 can register various input means and can set functions to the respective input means. If the user performs a gesture to the touch screen 133 with the input means, the electronic device 100 can identify the input means performing the gesture without separate setting, and can perform an operation corresponding to the input means.

The electronic device 100 can provide a menu 425 of changing a function set to the input means. The electronic device 100 can register the input means, and can set a representative function or a function usable in a program, to the registered input means. If the user performs a gesture to the touch screen 133 with the input means, the electronic device 100 can perform an instruction corresponding to the gesture. Through the representative function change menu 425, the electronic device 100 can change the function set to the registered input means.

The electronic device 100 can provide a menu 427 of initializing input means information stored in the database of the memory. If there is an error in the input means information or there is a need to delete all the input means information at one time, the electronic device 100 can delete all the input means information stored in the database by a gesture such as a touch.

According to an embodiment of the present disclosure, when identifying the input means by the input means information stored in the database of the memory, the electronic device 100 can provide, though not illustrated, a menu of setting a tolerance range. If a user performs an indirect touch input to the touch screen 133 with the input means, there can be an error in capacitance variation measurement information of the input means and the input means information stored in the database, in accordance to conditions such as an angle of the indirect touch input using the input means. Accordingly, the electronic device 100 can provide the menu capable of setting the tolerance range such that no error occurs in identifying the input means by a small tolerance range.

The electronic device 100 can provide an okay menu 411 (i.e., an icon) of applying changed content in a setting step such as an input means setting menu of the input means processing program 116, and can provide a cancel menu 413 (i.e., an icon) capable of ending the setting step without applying the changed content.

The electronic device 100 can include a speaker 141 capable of outputting a sound at its upper side. The electronic device 100 can include a button 401, one of input devices capable of inputting an instruction by a click, at its lower side, and can include a touch button 403 or 405 capable of inputting an instruction through a touch at a fixed position. The electronic device 100 can include the speaker 141, the button 401, or the touch button 403 or 405 in the same position or different positions, though the speaker 141, the button 401, or the touch button 403 or 405 is not illustrated.

Figures 5A, 5B:
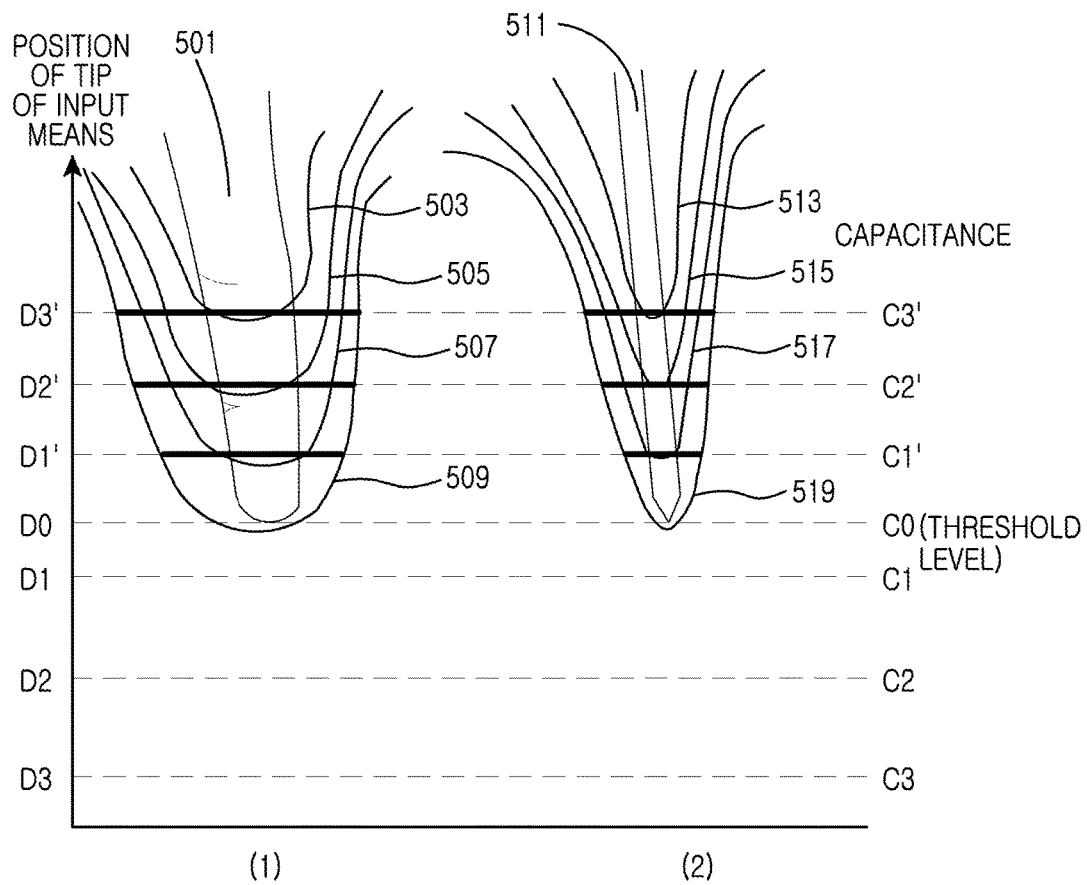
FIGS. 5A and 5B are diagrams illustrating an operation of identifying an input means of an electronic device according to various embodiments of the present disclosure.

FIGS. 5A and 5B are diagrams illustrating an operation of identifying an input means of an electronic device according to various embodiments of the present disclosure.

According to various embodiments of the present disclosure, in FIG. 2 or 3, if an input means approaches a touch screen 133, an electronic device 100 can sense a capacitance variation caused by the input means when the input means is positioned farther from a threshold level and determine an input of the input means based on a surface of the touch screen 133. Based on the capacitance variation, the electronic device 100 can determine a position of the input means in an electromagnetic field region corresponding to a tip of the input means (i.e., a part of the input means positioned closest to the surface of the touch screen 133 such as a tip of a finger or a tip of a touch pen).

According to various embodiments of the present disclosure, referring to (1) and/or (2) of FIG. 5A, if the input means is positioned in the electromagnetic field region of the touch screen 133, the electronic device 100 can confirm areas of various sizes of the input means in accordance to positions of the input means although measuring an area of the input means at the same capacitance.

According to an embodiment of the present disclosure referring to (1) of FIG. 5A, if a tip of an index finger 501 is positioned in an electromagnetic field region D3', a capacitance variation 503 of the electromagnetic field region D3' can be confirmed. According to an embodiment of the present disclosure, if the tip of the index finger 501 is positioned in an electromagnetic field region D2', a capacitance variation 505 of the electromagnetic field region D2' can be confirmed. According to an embodiment of the present disclosure, if the tip of the index finger 501 is positioned in an electromagnetic field region D1', a capacitance variation 507 of the electromagnetic field region D1' can be confirmed. According to an embodiment of the present disclosure, if the tip of the index finger 501 is positioned in an electromagnetic field region D0, a capacitance variation 509 of the electromagnetic field region D0 can be confirmed.

As described above, it can be confirmed that area information of the input means, which is acquired corresponding to a form of the input means at a fixed capacitance value, is varied in accordance to a change of a position of the input means. The electronic device 100 can confirm that, if the input means generates a unique capacitance variation pattern, the capacitance variation pattern of the input means dependent on the change of the position of the input means is varied with a characteristic as well.

Referring to (1) of FIG. 5A, when the electronic device 100 is set to sense an input means approaching the touch screen 133 starting from the electromagnetic field region D3' in an input means setting operation of the electronic device 100, if the tip of the index finger 501 is positioned in the electromagnetic field region D3' and thus varies capacitance C3', the electronic device 100 can confirm an area (or a capacitance variation pattern) of the index finger 501 of the capacitance C3' through the variation of the capacitance C3'. If the tip of the index finger 501 is positioned in the electromagnetic field region D2' and thus varies capacitance C2', the electronic device 100 can confirm areas of the index finger 501 of the capacitance C3' and C2' through the variation of the capacitance C3' and C2'. If the tip of the index finger 501 is positioned in the electromagnetic field region D1' and thus varies capacitance C1', the electronic device 100 can confirm areas of the index finger 501 of the capacitance C3', C2', and C1' through the variation of the capacitance C3', C2', and C1'. If the tip of the index finger 501 is positioned in the electromagnetic field region D0 and thus varies capacitance C0, the electronic device 100 can confirm areas of the index finger 501 of the capacitance C3', C2', and C1' through the variation of the capacitance C3', C2', and C1'.

According to an embodiment of the present disclosure, in confirming the area of the index finger 501 in the aforementioned method, if the tip of the index finger 501 is positioned in the electromagnetic field region D1' and thus varies the capacitance C1', the electronic device 100 can confirm areas of the index finger 501 of the capacitance C3' and C2' or confirm only an area of the index finger 501 of the capacitance C3' through the variation of the capacitance C3', C2', and C1'. The electronic device 100 is not limited to confirming the areas of the index finger 501 when the tip of the index finger 501 is positioned in the electromagnetic field region D1', and the electronic device 100 can also confirm the areas of the index finger 501 in accordance with the aforementioned method even when the tip of the index finger 501 is positioned in the electromagnetic field regions D3' and D2' and various electromagnetic field regions.

The electronic device 100 can determine the kind of an input means such as the index finger 501, with reference to two or more area information confirmed as the index finger 501 is positioned in an electromagnetic field region, and a database previously stored in a memory 110 of the electronic device 100, as illustrated in FIG. 1. The electronic device 100 can register area information about the index finger 501 in an input means setting operation through the same or similar setting operation to the aforementioned input means sensing method, and can compare the registered area information with acquired area information, thereby determining the input means. According to an embodiment of the present disclosure, if the electronic device 100 acquires capacitance C3' (or a variation of the capacitance C3') '6' and capacitance C2' '9' by positioning the index finger 501 in an electromagnetic field region D2' of the touch screen 133, the electronic device 100 can determine the index finger 501 as an input means WHD having the same or similar information, with reference to database information 521 of the electronic device 100, as illustrated in (3) of FIG. 5B. According to an embodiment of the present disclosure, if failing to determine the input means by the capacitance C3' (or the variation of the capacitance C3') '6' and the capacitance C2' '9' which are acquired by positioning the index finger 501 in the electromagnetic field region D2' of the touch screen 133, the electronic device 100 can additionally confirm capacitance C1' when the index finger 501 is positioned in an electromagnetic field region Dr, and determine an input means having the same or similar information in the database information 521 of the electronic device 100, as illustrated in (3) of FIG. 5B. If the index finger 501 is positioned in the electromagnetic field region D1', the electronic device 100 can again confirm the capacitance C3' or C2'. If confirming the capacitance C3' '6', the capacitance C2' '9', and the capacitance C1' "10', the electronic device 100 can determine the index finger 501 as the input means WHD having the same or similar information with reference to the database information 521 of the electronic device 100, as illustrated in (3) of FIG. 5B. As described above, the electronic device 100 can identify the kind of the input means before the tip of the index finger 501 reaches the electromagnetic field region D0 of the threshold level. If sensing a variation of the capacitance C0 by positioning the tip of the index finger 501 in the threshold level D0, the electronic device 100 can determine that it inputs an instruction, and can perform an operation corresponding to the input means WHD.

According to an embodiment of the present disclosure referring to (2) of FIG. 5A, if a tip of a touch pen 511 is positioned in an electromagnetic field region D3', a capacitance variation 513 of the electromagnetic field region D3' can be confirmed. According to an embodiment of the present disclosure, if the tip of the touch pen 511 is positioned in an electromagnetic field region D2', a capacitance variation 515 of the electromagnetic field region D2' can be confirmed. According to an embodiment of the present disclosure, if the tip of the touch pen 511 is positioned in an electromagnetic field region D1', a capacitance variation 517 of the electromagnetic field region D1' can be confirmed. According to an embodiment of the present disclosure, if the tip of the touch pen 511 is positioned in an electromagnetic field region D0, a capacitance variation 519 of the electromagnetic field region D0 can be confirmed.

As described above, it can be confirmed that area information of the input means, which is acquired corresponding to a form of the input means at a fixed capacitance value, is varied according to a change of a position of the touch pen 511. The electronic device 100 can confirm that, if the input means generates a unique capacitance variation pattern, the capacitance variation pattern of the input means dependent on the change of the position of the input means is varied with a characteristic as well.

Referring to (2) of FIG. 5A, when the electronic device 100 is set to sense an input means approaching the touch screen 133 of the electronic device 100 starting from the electromagnetic field region D3' in an input means setting operation of the electronic device 100, if the tip of the touch pen 511 is positioned in the electromagnetic field region D3' and thus varies the capacitance C3', the electronic device 100 can confirm an area (or a capacitance variation pattern) of the touch pen 511 of the capacitance C3' through the variation of the capacitance C3'. If the tip of the touch pen 511 is positioned in the electromagnetic field region D2' and thus varies the capacitance C2', the electronic device 100 can confirm areas of the touch pen 511 of the capacitance C3' and C2' through the variation of the capacitance C3' and C2'. If the tip of the touch pen 511 is positioned in the electromagnetic field region D1' and thus varies the capacitance C1', the electronic device 100 can confirm areas of the touch pen 511 of the capacitance C3', C2', and C1' through the variation of the capacitance C3', C2', and C1'. If the tip of the touch pen 511 is positioned in the electromagnetic field region D0 and thus varies the capacitance C0, the electronic device 100 can confirm areas of the touch pen 511 of the capacitance C3', C2', and C1' through the variation of the capacitance C3', C2', and C1'.

According to an embodiment of the present disclosure, in confirming the area of the touch pen 511 in the aforementioned method, if the tip of the touch pen 511 is positioned in the electromagnetic field region D1' and thus varies the capacitance C1', the electronic device 100 can confirm areas of the touch pen 511 of the capacitance C3' and C2' or confirm only an area of the touch pen 511 of the capacitance C3' through the variation of the capacitance C3', C2', and C1'. The electronic device 100 is not limited to confirming the areas of the touch pen 511 when the tip of the touch pen 511 is positioned in the electromagnetic field region D1', and the electronic device 100 can also confirm the areas of the touch pen 511 in accordance to the aforementioned method even when the tip of the touch pen 511 is positioned in the electromagnetic field regions D3' and D2' and various electromagnetic field regions.

The electronic device 100 can determine the kind of an input means such as the touch pen 511, with reference to two or more area information, which are confirmed as the touch pen 511 is positioned in an electromagnetic field region, and a database previously stored in the memory 110 of the electronic device 100. The electronic device 100 can register area information about the touch pen 511 in an input means setting operation through the same or similar setting operation to the aforementioned input means sensing method, and can compare the registered area information with acquired area information, thereby determining the input means. According to an embodiment of the present disclosure, if the electronic device 100 acquires capacitance C3' (or a variation of the capacitance C3') '10' and capacitance C2 '13' by positioning the touch pen 511 in an electromagnetic field region D2' of the touch screen 133, the electronic device 100 can determine the touch pen 511 as an input means GUS having the same or similar information, with reference to database information 521 of the electronic device 100, as illustrated in (3) of FIG. 5B. According to an embodiment, if failing to determine the input means by the capacitance C3' (or the variation of the capacitance C3') '10' and the capacitance C2' '13' which are acquired by positioning the touch pen 511 in the electromagnetic field region D2' of the touch screen 133, the electronic device 100 can additionally confirm capacitance C1' when the touch pen 511 is positioned in an electromagnetic field region D1', and determine an input means having the same or similar information in the database information 521 of the electronic device 100. If the touch pen 511 is positioned in the electromagnetic field region D1', the electronic device 100 can again confirm the capacitance C3' or C2'. If confirming the capacitance C3' '10', the capacitance C2' '13', and the capacitance C1' '15', the electronic device 100 can determine the touch pen 511 as the input means GUS having the same or similar information with reference to the database information 521 of the electronic device 100, as illustrated in (3) of FIG. 5B. As described above, the electronic device 100 can identify the kind of the input means before the tip of the touch pen 511 reaches the electromagnetic field region D0 of the threshold level. If sensing a variation of the capacitance C0 by positioning the tip of the touch pen 511 in the threshold level D0, the electronic device 100 can determine that it inputs an instruction, and can perform an operation corresponding to the input means GUS.

Figure 6:
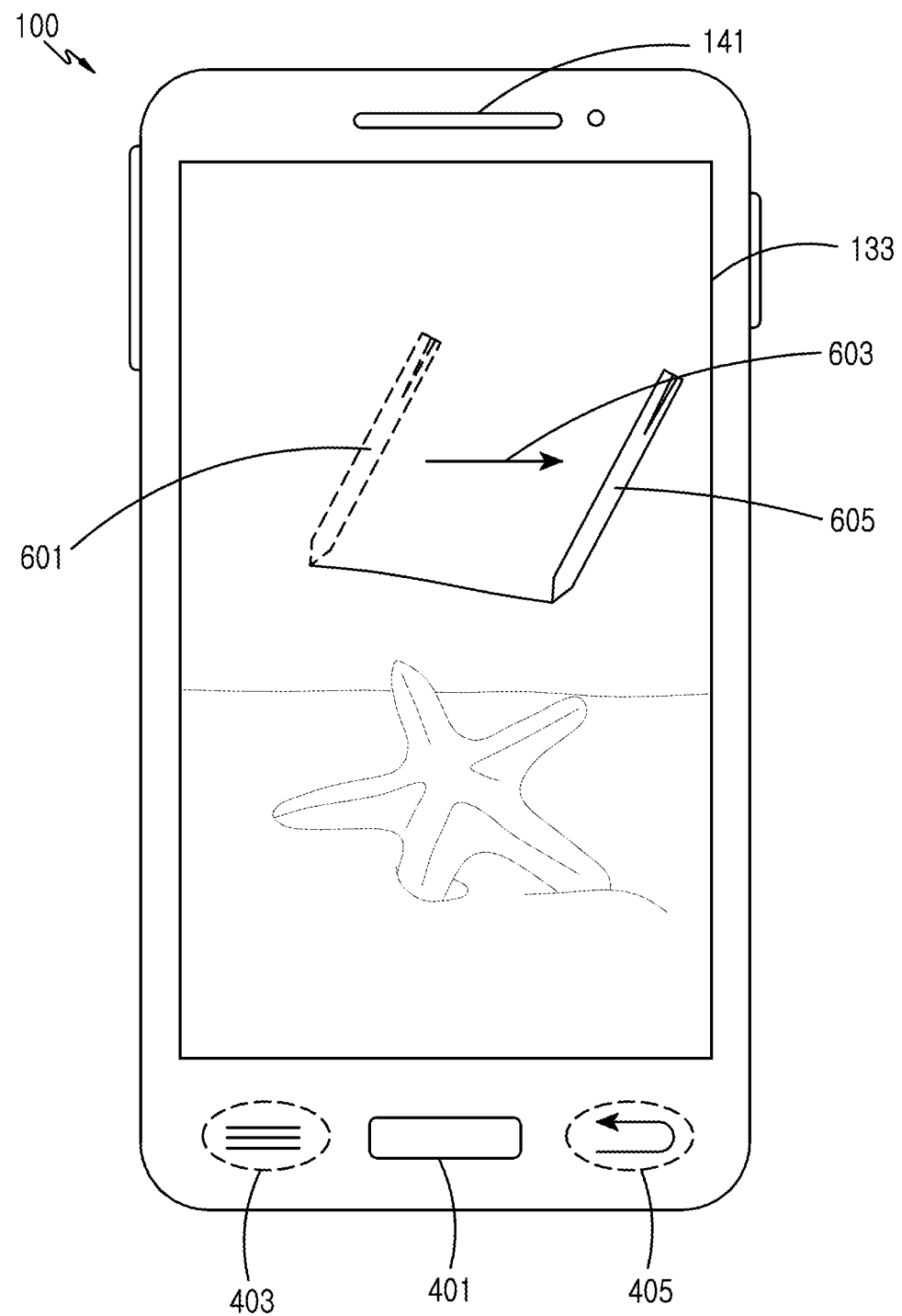
FIG. 6 is a diagram illustrating an operation performed in response to an input of an input means of an electronic device according to an embodiment of the present disclosure.

FIG. 6 is a diagram illustrating an operation performed in response to an input of an input means of an electronic device according to an embodiment of the present disclosure.

Referring to FIG. 6, an electronic device 100 is illustrated, where the electronic device 100 can input an instruction to a touch screen 133 by a gesture of an input means registered to a database of the electronic device 100. By identifying the input means, the electronic device 100 can perform an instruction corresponding to the input means and the gesture.

In an embodiment of the present disclosure, referring to FIG. 4B, an input means QOR has been registered to the database of the electronic device 100, and the input means QOR can be a touch pen, and a drag gesture of the input means QOR can have been stored to perform a pen function in a drawing program.

The electronic device 100 can perform a gesture to the touch screen 133 with the touch pen, without setting a function of the touch pen during an operation of the drawing program. Referring to FIG. 2 or 3, the electronic device 100 can sense a variation of capacitance C1 and/or C2 through a touch screen panel sensing an indirect touch input, and can determine an area of the touch pen of a threshold level C0 or a predefined capacitance value. If a user performs the indirect touch input with the touch pen, the area of the touch pen is acquired as '6' due to a capacitance variation of the threshold level C0 of a time point from which the capacitance C1 is varied, and the area of the touch pen is acquired as '7' due to a capacitance variation of the threshold level C0 of a time point from which the capacitance C2 is varied. The electronic device 100 can identify that the touch pen is the input means QOR with reference to the acquired two areas and the database 421 of FIG. 4B, and can determine a touch pen function corresponding to the input means QOR in the database. A user can perform an operation 601 of touching the touch screen 133 with the touch pen, an operation 603 of dragging with touching and holding, and a touch release operation 605. The electronic device 100 can apply to a drag overlay image an effect of the touch pen function having been set to the database corresponding to the gesture. According to an embodiment of the present disclosure, the electronic device 100 can apply the touch pen function (e.g., a pencil, a colored pencil, a coal, or a brush) of the touch pen to a gesture of inputting to the touch screen 133 with the touch pen, and display the gesture applying the touch pen function.

According to various embodiments of the present disclosure, if sensing a plurality of input means concurrently, the electronic device 100 can identify the sensed plurality of input means and give functions to the plurality of input means. The electronic device 100 can also set such that an input of one input means controls functions of one or more other input means.

According to an embodiment of the present disclosure, the electronic device 100 can identify a registered 1st input means (e.g., a touch pen) and a registered 2nd input means (e.g., an index finger) in accordance to the above input means identification method.

The electronic device 100 can set a function of changing a color of the touch pen, to the index finger in accordance to database information. The electronic device 100 can sense an operation of changing a height in a position of the index finger spaced apart from the touch screen 133 (i.e., an operation of changing a distance between the index finger and the touch screen). The electronic device 100 can change a color of the touch pen function (e.g., the pencil, the colored pencil, the coal, or the brush) set to the touch pen, in accordance to a height sensing the index finger. The color information set to the touch pen correspondingly to the height sensing the index finger can be information previously stored in the database of a memory 110 of the electronic device 100, as illustrated in FIG. 1. The electronic device 100 can apply a color decided by the index finger to the gesture of inputting to the touch screen 133 with the touch pen, and display the gesture applying the color.

The electronic device 100 can include a speaker 141 capable of outputting a sound at its upper side. The electronic device 100 can include a button 401, one of input devices capable of inputting an instruction by a click, at its lower side, and can include a touch button 403 or 405 capable of inputting an instruction through a touch at a fixed position. The electronic device 100 can include the speaker 141, the button 401, or the touch button 403 or 405 in the same position or different positions, though the speaker 141, the button 401, or the touch button 403 or 405 is not illustrated.

Figure 7:
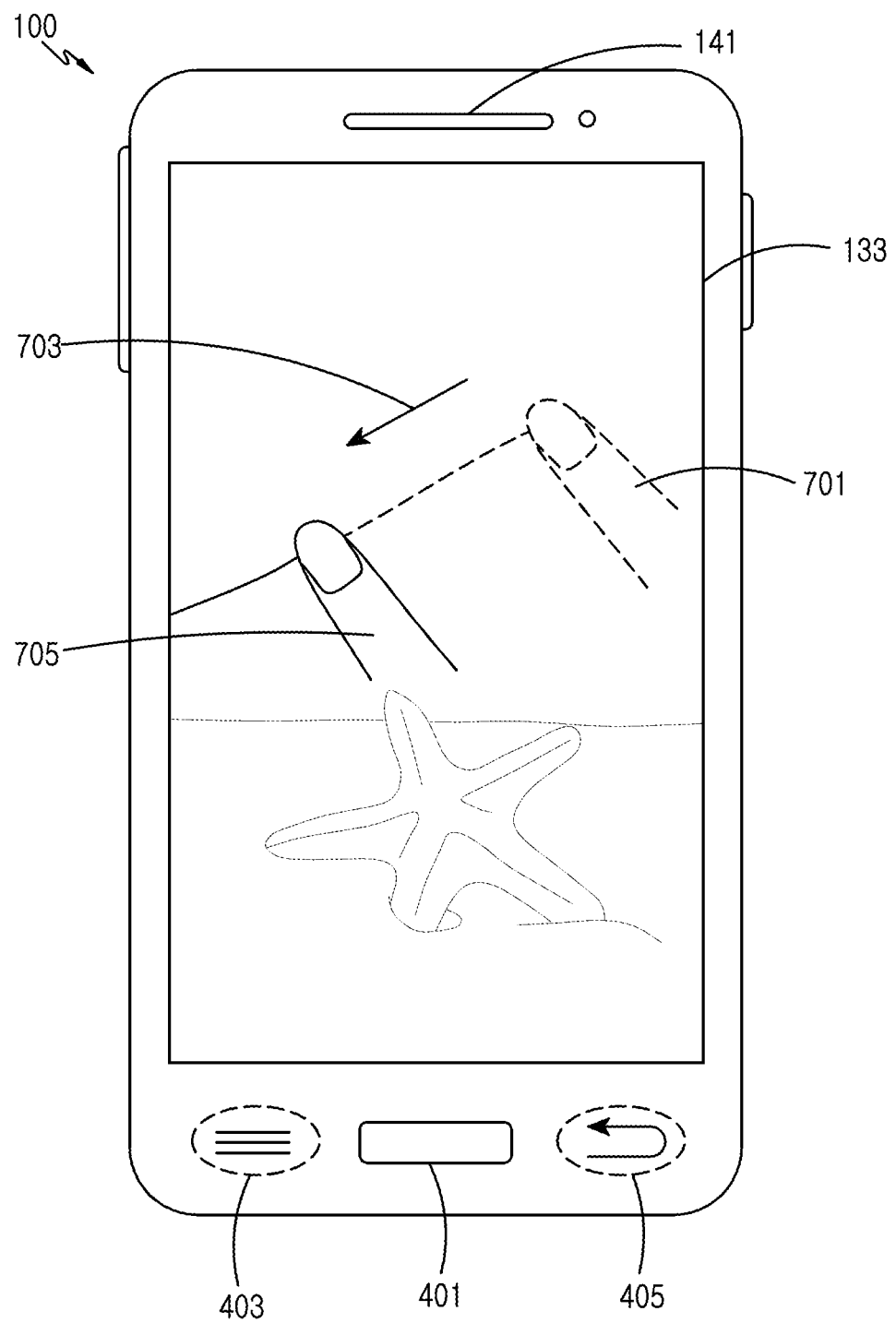
FIG. 7 is a diagram illustrating an operation performed in response to an input of an input means of an electronic device according to an embodiment of the present disclosure.

FIG. 7 is a diagram illustrating an operation performed in response to an input of an input means of an electronic device according to an embodiment of the present disclosure.

Referring to FIG. 7, an electronic device 100 is illustrated, where the electronic device 100 can input an instruction to a touch screen 133 by a gesture of an input means registered to a database of the electronic device 100. By identifying the input means, the electronic device 100 can perform an instruction corresponding to the input means and the gesture.

In an embodiment of the present disclosure, referring to FIG. 4B, an input means WHD has been registered to the database of the electronic device 100, and the input means WHD can be an index finger, and a drag gesture of the input means WHD can have been stored to perform a pen function in a drawing program.

The electronic device 100 can perform an operation of drawing a painting on the touch screen 133 with the touch pen of FIG. 6 during an operation of a drawing program, and perform a gesture to the touch screen 133 with the index finger, without particular setting change. Referring to FIG. 2 or 3, the electronic device 100 can sense a variation of capacitance C1 and/or C2 through a touch screen panel sensing an indirect touch input, and can determine an area of the index finger of a threshold level C0 or a predefined capacitance value. If a user performs the indirect touch input with the index finger, the area of the index finger is acquired as '6' due to a capacitance variation of the threshold level C0 of a time point from which the capacitance C1 is varied, and the area of the index finger is acquired as '10' due to a capacitance variation of the threshold level C0 of a time point from which the capacitance C2 is varied. The electronic device 100 can identify that the index finger is the input means WHD with reference to the acquired two areas and the database 421 of FIG. 4B, and can determine an index finger function corresponding to the input means WHD in the database. A user can perform an operation 701 of touching the touch screen 133 with the index finger, an operation 703 of dragging with touching and holding, and a touch release operation 705. The electronic device 100 can apply to a drag overlay image an effect of the eraser function having been set to the database corresponding to the gesture. According to an embodiment of the present disclosure, the electronic device 100 can apply and display an operation of erasing displayed objects of the touch screen 133 in response to a gesture of inputting to the touch screen 133 with the index finger.

The electronic device 100 can include a speaker 141 capable of outputting a sound at its upper side. The electronic device 100 can include a button 401, one of input devices capable of inputting an instruction by a click, at its lower side, and can include a touch button 403 or 405 capable of inputting an instruction through a touch at a fixed position. The electronic device 100 can include the speaker 141, the button 401, or the touch button 403 or 405 in the same position or different positions, though the speaker 141, the button 401, or the touch button 403 or 405 is not illustrated.

Figure 8:
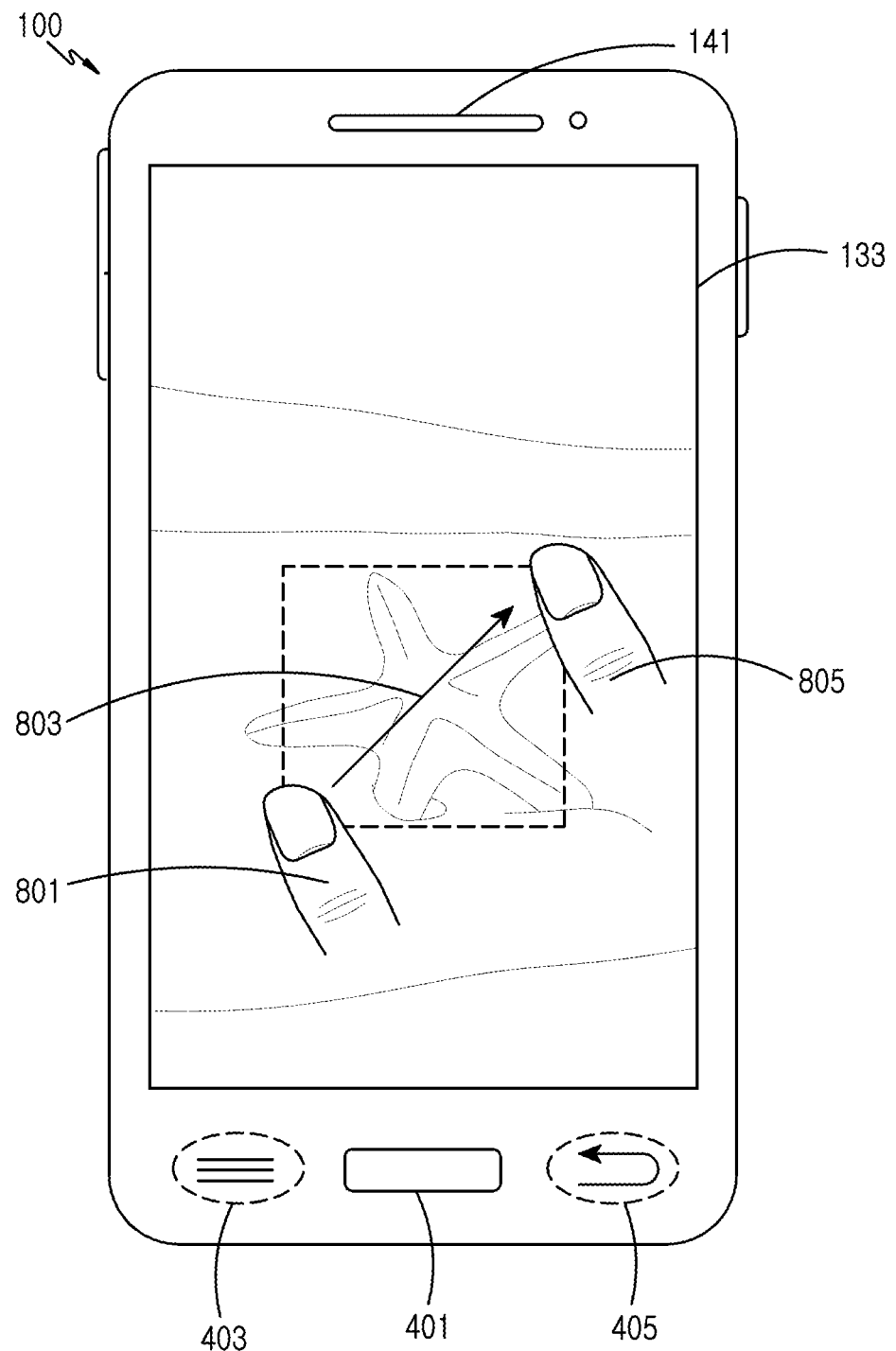
FIG. 8 is a diagram illustrating an operation performed in response to an input of an input means of an electronic device according to an embodiment of the present disclosure.

FIG. 8 is a diagram illustrating an operation performed in response to an input of an input means of an electronic device according to an embodiment of the present disclosure.

Referring to FIG. 8, an electronic device 100 is illustrated, where the electronic device 100 can input an instruction to a touch screen 133 by a gesture of an input means registered to a database of the electronic device 100. By identifying the input means, the electronic device 100 can perform an instruction corresponding to the input means and the gesture.

In an embodiment of the present disclosure, referring to FIG. 4B, an input means GUS has been registered to the database of the electronic device 100, the input means GUS can be a thumb, and a drag gesture of the input means GUS can have been stored to perform a region setting function in a drawing program.

The electronic device 100 can perform an operation of drawing a painting on the touch screen 133 with the touch pen of FIG. 6 during an operation of a drawing program and/or an operation of erasing a painting drawn on the touch screen 133 with the index finger of FIG. 7, and perform a gesture to the touch screen 133 with the thumb, without particular setting change. Referring to FIG. 2 or 3, the electronic device 100 can sense a variation of capacitance C1 and/or C2 through a touch screen panel sensing an indirect touch input, and can determine an area of the thumb of a threshold level C0 or a predefined capacitance value. If a user performs the indirect touch input with the thumb, the area of the thumb is acquired as '10' due to a capacitance variation of the threshold level C0 of a time point from which the capacitance C1 is varied, and the area of the thumb is acquired as '13' due to a capacitance variation of the threshold level C0 of a time point from which the capacitance C2 is varied. The electronic device 100 can identify that the thumb is the input means GUS with reference to the acquired two areas and the database 421 of FIG. 4B, and can determine a thumb function corresponding to the input means GUS in the database. A user can perform an operation 801 of touching the touch screen 133 with the thumb, an operation 803 of dragging with touching and holding, and a touch release operation 805. The electronic device 100 can select a certain region of an object such as an image displayed on the touch screen 133 in accordance to the region setting function having been set to the database corresponding to the gesture.

According to various embodiments of the present disclosure, if a user inputs an indirect touch instruction to the touch screen 133 through two or more pre-registered input means, the electronic device 100 can identify the two or more pre-registered input means respectively, and can perform functions corresponding to the respective identified input means.

According to an embodiment of the present disclosure, if the touch pen and the thumb are concurrently sensed on the touch screen 133 of the electronic device 100, the electronic device 100 can perform a function of applying a pen effect of the touch pen and drawing a painting and a function of applying an eraser function of the thumb and erasing an existing input, respectively.

According to an embodiment of the present disclosure, if the user inputs an instruction to the touch screen 133 through two or more pre-registered input means, the electronic device 100 can identify the two or more pre-registered input means respectively, and can perform a function defined in each independent input means and a function corresponding to a condition of sensing other two or more pre-registered input means.

The electronic device 100 can include a speaker 141 capable of outputting a sound at its upper side. The electronic device 100 can include a button 401, one of input devices capable of inputting an instruction by a click, at its lower side, and can include a touch button 403 or 405 capable of inputting an instruction through a touch at a fixed position. The electronic device 100 can include the speaker 141, the button 401, or the touch button 403 or 405 in the same position or different positions, though the speaker 141, the button 401, or the touch button 403 or 405 is not illustrated.

Figure 9A:
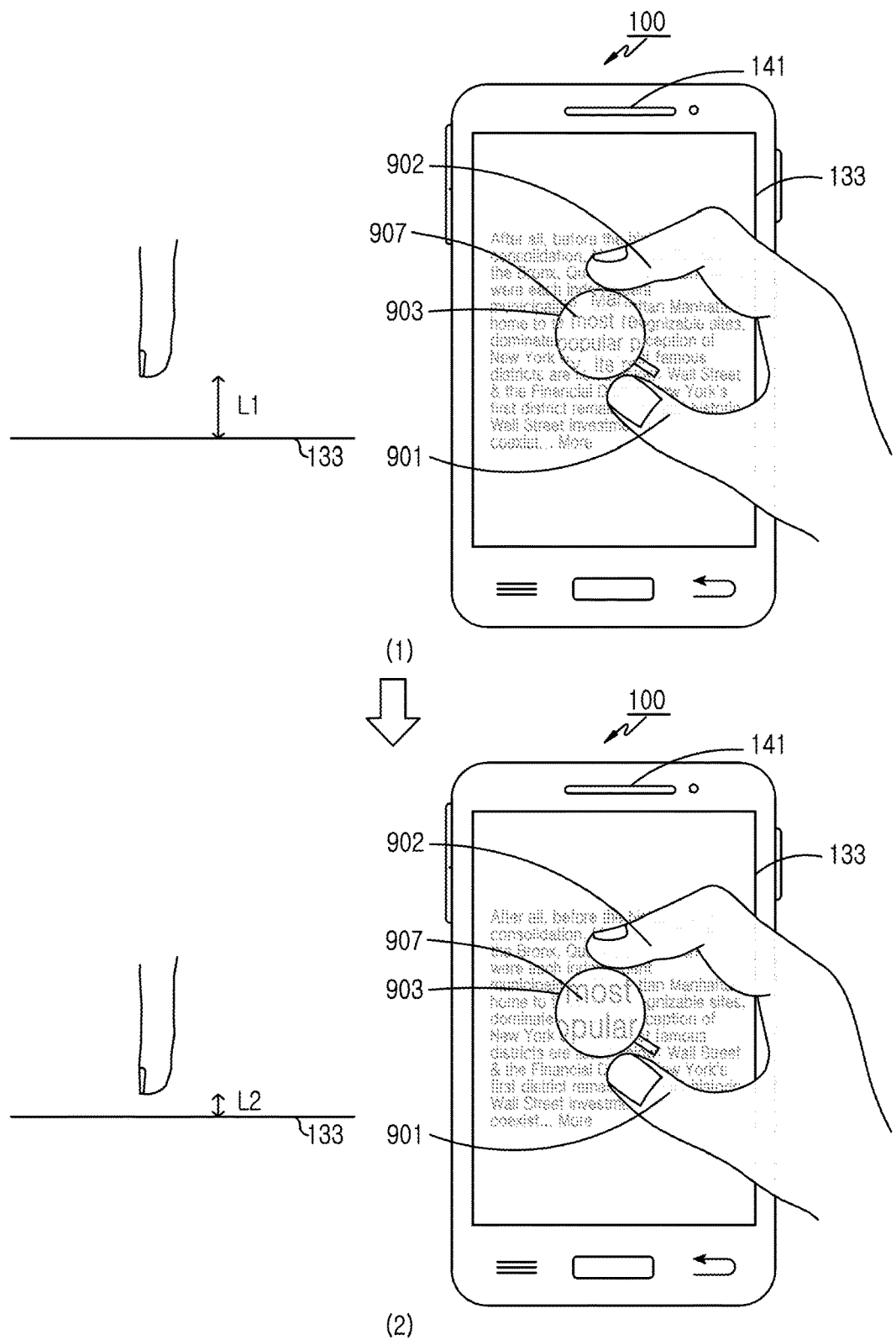
FIGS. 9A and 9B are diagrams illustrating an operation performed in response to an input of an input means of an electronic device according to various embodiments of the present disclosure.
Figure 9B:
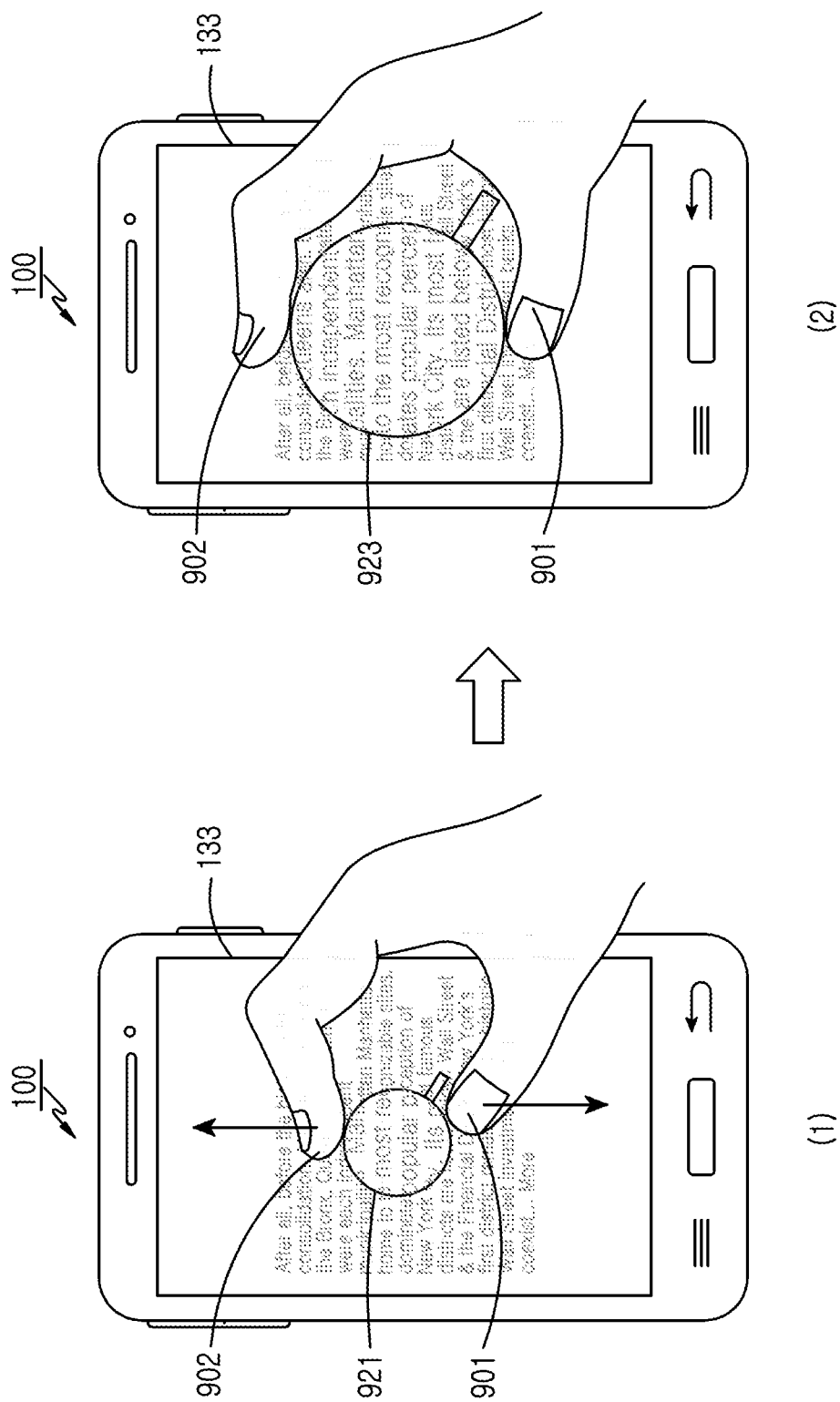

FIGS. 9A and 9B are diagrams illustrating an operation performed in response to an input of an input means of an electronic device according to various embodiments of the present disclosure.

If a user inputs instructions concurrently with a plurality of input means not being registered to a database, or if the user inputs instructions concurrently with a plurality of input means including one or more registered input means, the electronic device can perform a corresponding operation. If the user inputs the instructions concurrently with the plurality of input means, the electronic device can distinguish and define operations corresponding to an indirect touch input and a direct touch input, and can identically apply an instruction corresponding to the indirect touch input, even to the direct touch input.

Referring to (1) of FIG. 9A, a thumb can be registered to a database of an electronic device 100. By performing an indirect touch input, the thumb can be identified in the electronic device 100. The remnant fingers have not been registered. If a user concurrently performs an indirect touch to a certain region of a touch screen 133 with the thumb and an index finger, the electronic device 100 can sense the thumb through the touch screen 133, and can determine the remnant fingers as non-registered input means. The electronic device 100 can include at least one registered input means in the database and perform operations corresponding to instructions inputted concurrently with two input means. The corresponding operation stored in the database can be an operation of applying a magnifying glass function to a certain region indicated by the input means to display the magnified certain region. The electronic device 100 can apply the magnifying glass function to regions indicated by two input means and display the magnified regions on the touch screen 133.

According to an embodiment of the present disclosure, if the user indicates a certain region of an object displayed on the touch screen 133 with a thumb 901 and an index finger 902 with the thumb 901 and the index finger 902 being spaced as much as L1 apart from a surface of the touch screen 133, he/she can select a region intended to be magnified. The electronic device 100 can determine a region corresponding to the thumb 901 and the index finger 902, and can display an object 903 corresponding to a magnifying glass function on the touch screen 133, and can magnify and display the selected region by the object 903.

Referring to (2) of FIG. 9A, in a state where the electronic device 100 selects a certain region of the touch screen 133 with the thumb 901 and the index finger 902 being spaced as much as L1 apart from the surface of the touch screen 133 as described in (1) of FIG. 9A, the electronic device 100 can reset to L2 a distance between the thumb 901 and index finger 902 and the surface of the touch screen 133. If the user performs an input of changing from L1 to L2 the distance with the surface of the touch screen 133 on which the thumb 901 and the index finger 902 are positioned, the electronic device 100 can perform an operation corresponding to the input. The operation of the electronic device 100 corresponding to the input of changing the above distance from L1 to L2 can be an operation of magnifying information which is displayed through the object 903 corresponding to the magnifying glass function previously displayed on the touch screen 133. The electronic device 100 can magnify information 907 displayed through the object 903 corresponding to the magnifying glass function, and display the magnified information 907.

According to an embodiment of the present disclosure, in performing an operation corresponding to a gesture input through two or more input means, the electronic device 100 is not limited to the aforementioned magnifying glass function, and can control to perform various functions by setting an operation of the electronic device 100 corresponding to an input of an input means in an input means setting menu.

According to an embodiment of the present disclosure, an operation of magnifying or reducing a certain region displayed on the touch screen 133 through an icon corresponding to the magnifying glass function can be a result of inputting an instruction by performing an indirect touch input to the touch screen 133 with a pre-registered input means (e.g., the thumb 901) and a non-registered input means (e.g., the index finger 902) in accordance to information stored in the database of the electronic device 100. The electronic device 100 can be set to perform functions other than the magnifying glass function of magnifying or reducing a selected certain region, if a user performs a direct touch input to the touch screen 133 with the thumb 901 and the index finger 902 to input an instruction. The operation corresponding to the direct touch input can be an operation of magnifying or reducing the displayed content of the touch screen 133, not the magnifying glass function. If the user performs the direct touch input while executing the magnifying glass function through the indirect touch input to the touch screen 133 with the thumb 901 and the index finger 902, the electronic device 100 can perform an operation of releasing the displaying of the object 903 or the information 907 corresponding to the magnifying glass function, and magnifying or reducing the displayed content of the touch screen 133.

Referring to (1) of FIG. 9B, the user can perform an indirect touch input to a touch screen 133 with a thumb 901 and an index finger 902, thereby magnifying or reducing a certain region displayed on the touch screen 133 through an object 921 corresponding to a magnifying glass function and displaying the magnified or reduced certain region. Referring to (1) or 2 of FIG. 9Ar, the electronic device 100 can perform other operations previously stored in the database of the electronic device 100 in a state of keeping a distance of L1 or L2 between the thumb 901 and index finger 902 and the touch screen 133. According to an embodiment of the present disclosure, the electronic device 100 can perform a gesture of increasing a distance between the thumb 901 and the index finger 902 controlling the magnifying glass function, by an operation of large resetting a size of a magnifying glass in accordance to information stored in the database of the electronic device 100.

Referring to (2) of FIG. 9B, an electronic device 100 can sense through a touch screen 133 a gesture of increasing the distance between a thumb 901 and an index finger 902 which are performing the indirect touch input to the touch screen 133. The electronic device 100 can large reset a size of an object 923 corresponding to the magnifying glass function displayed on the touch screen 133. The electronic device 100 can magnify or reduce some contents displayed on the touch screen 133 corresponding to a region indicated by the thumb 901 and index finger 902 by means of the object 923 corresponding to the magnifying glass function, and display the magnified or reduced contents.

According to an embodiment of the present disclosure, the user can perform the indirect touch input or the direct touch input to the touch screen 133 of the electronic device 100 with two or more input means. The electronic device 100 can perform an operation corresponding to an input of a pre-registered input means (e.g., the thumb) and a non-registered input means (e.g., the index finger). According to an embodiment of the present disclosure, if the user performs the indirect touch input or the direct touch input to the touch screen 133 with non-registered two or more input means, the electronic device 100 can perform an operation corresponding the general indirect touch input or direct touch input, or can also perform an operation previously stored in the database of the electronic device 100.

Figure 10:
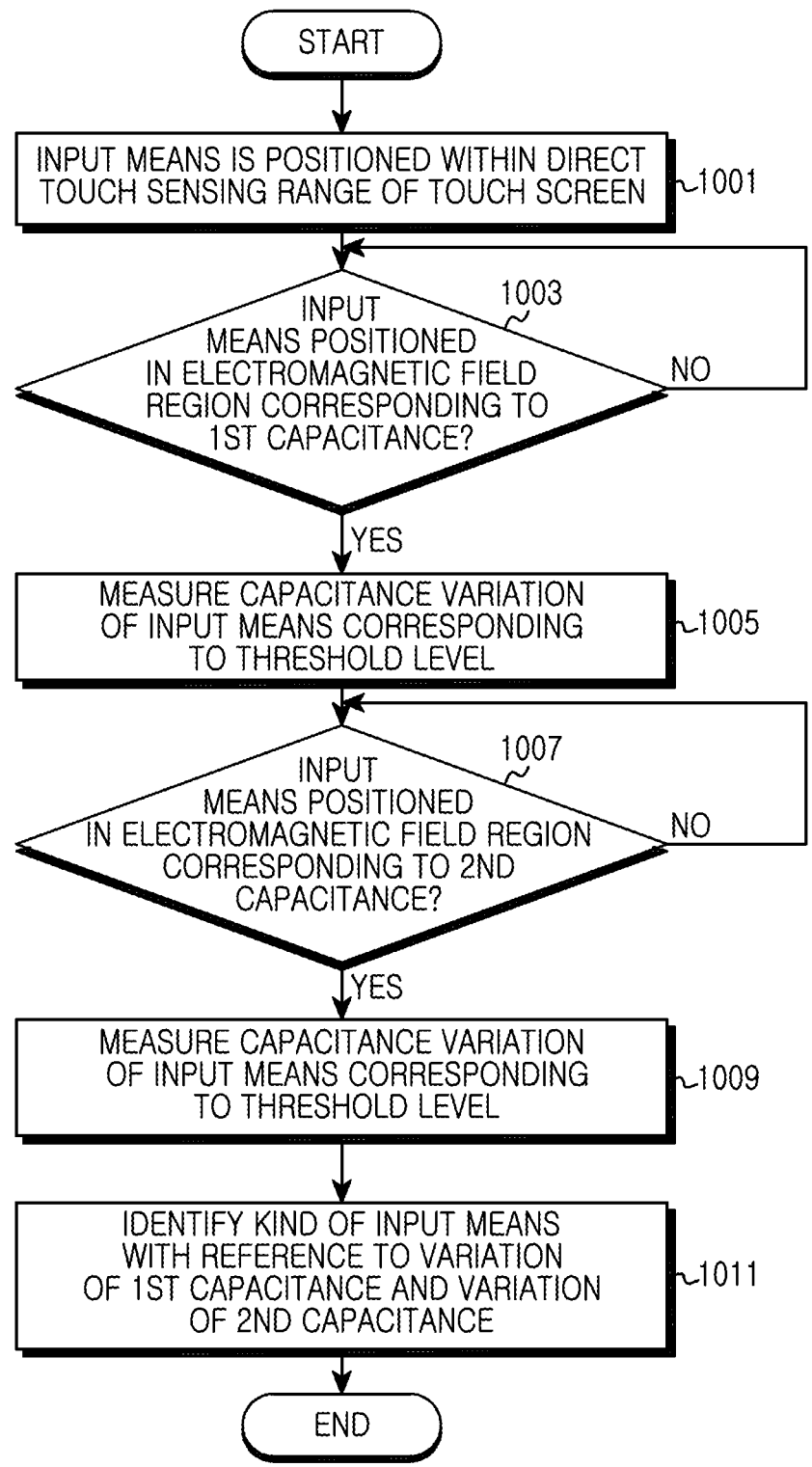
FIG. 10 is a flowchart illustrating an operation of an electronic device according to an embodiment of the present disclosure.

FIG. 10 is a flowchart illustrating an operation of an electronic device according to an embodiment of the present disclosure.

Referring to FIGS. 1 and 10, if an input means is positioned within a threshold level of an indirect touch input sensing capacitance of a touch screen 133, an electronic device 100 can determine a variation of capacitance of the threshold level, and can acquire areas of the input means through the capacitance variation, and can identify the input means with reference to the acquired areas and a database.

Referring to FIG. 10, operation 1001 is illustrated, such that in operation 1001, the electronic device 100 can determine if the input means is positioned in an indirect touch input sensing range of a touch screen panel sensing an indirect touch input. The input means for inputting an instruction through an indirect touch can be an input means such as a touch pen, a hand, and a finger which can induce a variation of capacitance from an electromagnetic field region of the touch screen panel.

When being positioned in an input means sensing region formed on a touch screen, the input means can induce a variation of capacitance. The electronic device 100 can determine a position of the input means on the touch screen panel (i.e., a distance from the touch screen panel) through the variation of capacitance.

In operation 1003, when a tip of the input means reaches a position corresponding to a 1st capacitance, the electronic device 100 can sense a variation of the 1st capacitance. If sensing the variation of the 1st capacitance, the electronic device 100 can perform operation 1005. If there is not the variation of the 1st capacitance, the electronic device 100 can repeatedly perform operation 1003 until sensing the variation of the 1st capacitance.

In operation 1005, if sensing the variation of the 1st capacitance, the electronic device 100 can measure a capacitance variation of a predefined position (i.e., the threshold level), and can acquire an area of the input means through the capacitance variation.

In an embodiment, referring to FIG. 2 or 3, if the tip of the input means reaches capacitance C1, the electronic device 100 can sense a variation of the capacitance C1. The electronic device 100 can measure the capacitance variation of the threshold level C0 of a time point from which the capacitance C1 is varied. Through the measured capacitance variation, the electronic device 100 can determine a 1st area of the input means corresponding to a position of the threshold level of the time point from which the capacitance C1 is varied.

In operation 1007, when the tip of the input means reaches a position corresponding to a 2nd capacitance, the electronic device 100 can sense a variation of the 2nd capacitance. If sensing the variation of the 2nd capacitance, the electronic device 100 can perform operation 1009. If there is not the variation of the 2nd capacitance, the electronic device 100 can repeatedly perform operation 1007 until sensing the variation of the 2nd capacitance.

In operation 1009, if sensing the variation of the 2nd capacitance, the electronic device 100 can measure a capacitance variation of a predefined position (i.e., the threshold level), and can acquire an area of the input means through the capacitance variation.

In an embodiment of the present disclosure, referring to FIG. 2 or 3, if the tip of the input means reaches capacitance C2, the electronic device 100 can sense a variation of the capacitance C2. The electronic device 100 can measure the capacitance variation of the threshold level C0 of a time point from which the capacitance C2 is varied. Through the measured capacitance variation, the electronic device 100 can determine a 2nd area of the input means corresponding to a position of the threshold level of the time point from which the capacitance C2 is varied.

In operation 1011, the electronic device 100 can identify the input means with reference to the acquired plurality of areas.

Through the measured capacitance variation, the electronic device 100 can determine the 1st area and the 2nd area of the input means, and can determine an identification code of the input means with reference to measured capacitance variation data and/or area data and data decided at a time of registering the input means to the database.

After performing operation 1011, the electronic device 100 can terminate the operations of FIG. 10.

Figure 11:
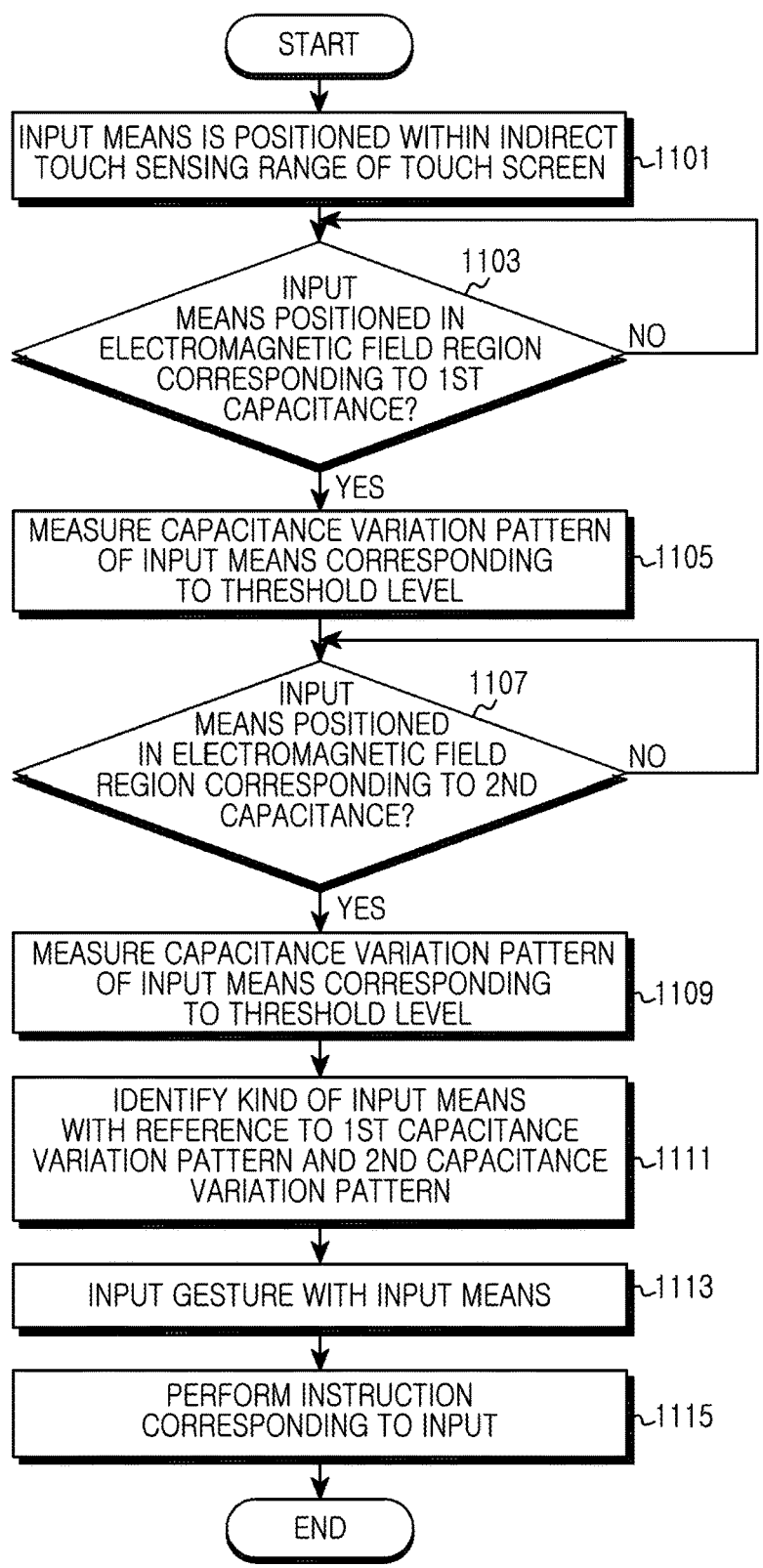
FIG. 11 is a flowchart illustrating an operation of an electronic device according to an embodiment of the present disclosure.

FIG. 11 is a flowchart illustrating an operation of an electronic device according to an embodiment of the present disclosure.

Referring to FIGS. 1 and 11, if an input means is positioned within a threshold level of an indirect touch input sensing capacitance of a touch screen 133, an electronic device 100 can determine a variation of capacitance of the threshold level, and can acquire capacitance variation patterns of the input means through the capacitance variation, and can identify the input means with reference to the acquired capacitance variation patterns and a database.

Referring to FIG. 11, operation 1101 is illustrated, such that in operation 1101, the electronic device 100 can determine if the input means is positioned in an indirect touch input sensing range of a touch screen panel sensing an indirect touch input. The input means for inputting an instruction through an indirect touch can be an input means such as a touch pen, a hand, and a finger which can induce a variation of capacitance from an electromagnetic field region of the touch screen panel.

When the input means is positioned in an input means sensing region formed on a touch screen, the input means can induce a variation of capacitance. The electronic device 100 can determine a position of the input means on the touch screen panel (i.e., a distance from the touch screen panel) through the variation of capacitance.

In operation 1103, when a tip of the input means reaches a position corresponding to a 1st capacitance of an electromagnetic field region, the electronic device 100 can sense a variation of the 1st capacitance. If sensing the variation of the 1st capacitance, the electronic device 100 can perform operation 1105. If there is not the variation of the 1st capacitance, the electronic device 100 can repeatedly perform operation 1103 until sensing the variation of the 1st capacitance.

In operation 1105, if sensing the variation of the 1st capacitance, the electronic device 100 can measure a capacitance variation of a predefined position (i.e., the threshold level), and can acquire a capacitance variation pattern of the input means through the capacitance variation.

In an embodiment of the present disclosure, referring to FIG. 2 or 3, if the tip of the input means reaches capacitance C1, the electronic device 100 can sense a variation of the capacitance C1. The electronic device 100 can measure the capacitance variation of the threshold level C0 of a time point from which the capacitance C1 is varied. Through the measured capacitance variation, the electronic device 100 can determine a 1st capacitance variation pattern of the input means corresponding to a position of the threshold level of the time point from which the capacitance C1 is varied.

In operation 1107, when the tip of the input means reaches a position corresponding to a 2nd capacitance of the electromagnetic field region, the electronic device 100 can sense a variation of the 2nd capacitance. If sensing the variation of the 2nd capacitance, the electronic device 100 can perform operation 1109. If there is not the variation of the 2nd capacitance, the electronic device 100 can repeatedly perform operation 1107 until sensing the variation of the 2nd capacitance.

In operation 1109, if sensing the variation of the 2nd capacitance, the electronic device 100 can measure a capacitance variation of a predefined position (i.e., the threshold level), and can acquire a capacitance variation pattern of the input means through the capacitance variation.

In an embodiment of the present disclosure, referring to FIG. 2 or 3, if the tip of the input means reaches capacitance C2, the electronic device 100 can sense a variation of the capacitance C2. The electronic device 100 can measure the capacitance variation of the threshold level C0 of a time point from which the capacitance C2 is varied. Through the measured capacitance variation, the electronic device 100 can determine a 2nd capacitance variation pattern of the input means corresponding to a position of the threshold level of the time point from which the capacitance C2 is varied.

In operation 1111, the electronic device 100 can identify the input means with reference to the acquired plurality of capacitance variation patterns.

Through the measured capacitance variation, the electronic device 100 can determine the 1st capacitance variation pattern and the 2nd capacitance variation pattern of the input means, and can determine an identification code of the input means with reference to measured capacitance variation data and/or capacitance variation pattern data and data decided at a time of registering the input means to the database.

In operation 1113, the electronic device 100 can input a gesture to the touch screen panel through the input means. The electronic device 100 can input an instruction to the touch screen panel using an indirect touch input or a direct touch input.

In operation 1115, the electronic device 100 can perform an instruction corresponding to the gesture input through the input means. The electronic device 100 can confirm information of the identified input means with reference to the database, and can determine a function of the input means corresponding to the instruction inputted by the input means, and can perform the function of the input means in the electronic device 100.

Referring to FIGS. 6, 7, and 8, the electronic device 100 can perform an operation corresponding to the gesture which is inputted through the input means identified with reference to the database. Even when the user inputs the same gesture to the touch screen 133, the electronic device 100 can identify the input means, and can distinguish and operate functions corresponding to inputs of the plurality of input means which have been set in accordance to the plurality of input means, without separate change of the function of the input means.

In an embodiment of the present disclosure, the electronic device 100 can previously register a touch pen as an input means QOR to the database, and can be set to perform an operation of writing on the touch screen 133 as an operation corresponding to the touch pen.

The electronic device 100 can previously register an index finger as an input means WHD to the database, and can be set to perform an operation of changing a playback time point of multimedia data being playing, as an operation corresponding to the index finger.

During multimedia data playback, the electronic device 100 can input a gesture of touching or dragging a certain region of the touch screen 133 with touching and holding with the index finger. In response to the gesture, the electronic device 100 can toggle stopping playing multimedia data and playing the multimedia data or change a playback time point of the multimedia data being moving or playing.

If there is a need to write a memo during multimedia playback as above, the electronic device 100 can input a gesture of writing the memo on the touch screen 133 with the touch pen without separate setting, and the electronic device 100 can display memo content corresponding to the writing gesture on the touch screen 133.

According to an embodiment of the present disclosure, when a gesture of a thumb is set as an eraser operation to the database, if a user touches and drags some memo content on the touch screen 133 with touching and holding with the thumb without separate setting, the electronic device 100 can erase a writing of an overlay image region which is dragged with the thumb.

As described above, the electronic device 100 can previously register various input means to the database, and can set and store an operation corresponding to the input means. By inputting a gesture to the touch screen 133 with the input means without separate setting operation such as selecting the input means, defining an operation of the input means, or the like, the electronic device 100 can identify the input means inputting the gesture, and can perform an operation corresponding to the gesture of the identified input means.

After performing operation 1115, the electronic device 100 can terminate the operations of FIG. 11.

Figure 12A:
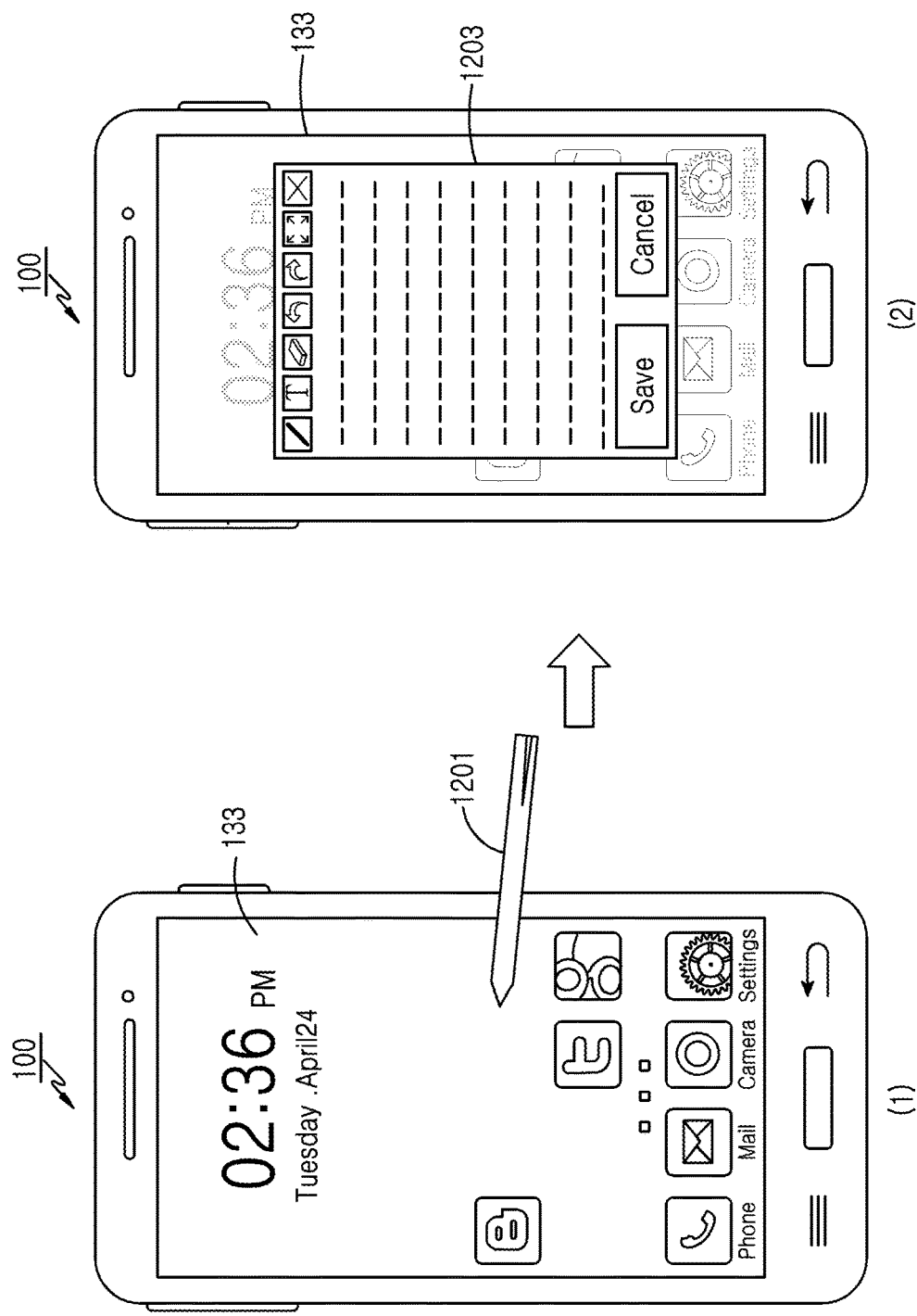
FIGS. 12A and 12B are diagrams illustrating an operation performed in response to an input of an input means of an electronic device according to various embodiments of the present disclosure.
Figure 12B:
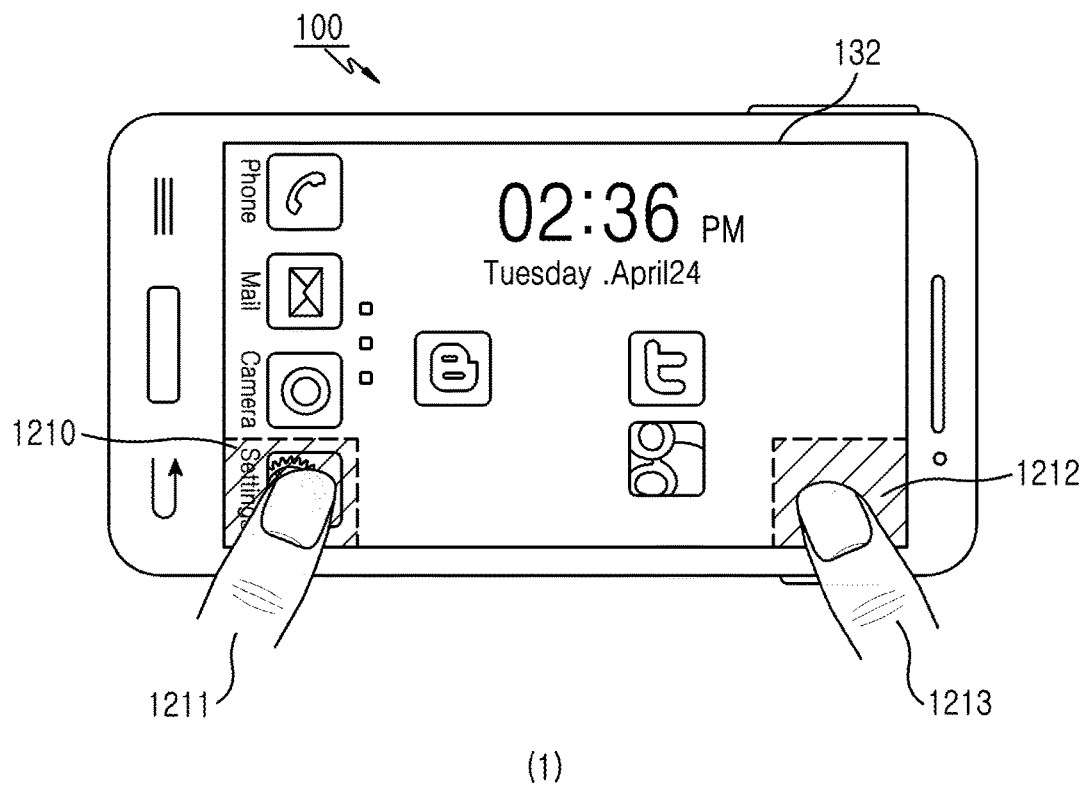
Figure 12B:
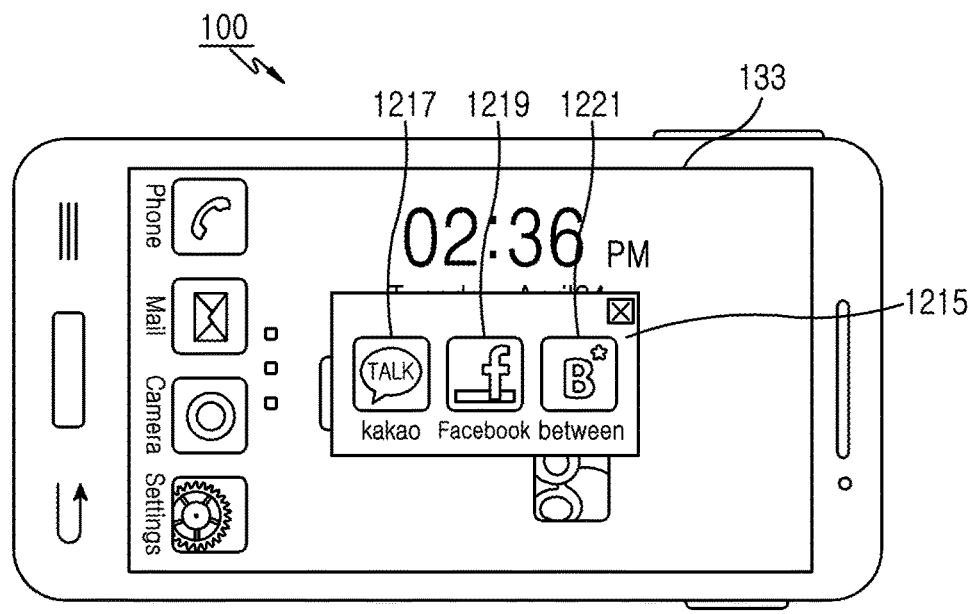

FIGS. 12A and 12B are diagrams illustrating an operation performed in response to an input of an input means of an electronic device according to various embodiments of the present disclosure.

Referring to FIGS. 12A and 12B, if a user inputs instructions concurrently with one or more input means that are not registered to a database of an electronic device 100, or if the user inputs instructions with one or more input means registered to the database of the electronic device 100, the electronic device 100 can perform operations designated to the instructions.

Referring to (1) of FIG. 12A, the electronic device 100 can sense an indirect touch input that the user performs to a touch screen 133 with one or more input means. The electronic device 100 can acquire a capacitance variation caused by the input means sensed on the touch screen 133. Based on the acquired capacitance variation, the electronic device 100 can determine whether an input means 1201 performing an indirect touch input to the touch screen 133 is the input means registered to the database of the electronic device 100. The electronic device 100 can perform a designated operation corresponding to the input means 1201 decided with reference to the database of the electronic device 100. If the user inputs an indirect touch gesture and/or direct touch gesture pre-registered to the database of the electronic device 100 with the input means, the electronic device 100 can perform a designated operation corresponding to the determined input means 1201 and the indirect touch gesture input.

Referring to (2) of FIG. 12A, the electronic device 100 can sense an indirect touch input caused by the input means 1201 in a state of displaying a designated screen construction on the touch screen 133. The electronic device 100 can sense a capacitance variation caused by the indirect touch input that the user performs to the touch screen 133 with the input means 1201. The input means 1201 has been registered to the database. The electronic device 100 can display a memo program 1203 on the touch screen 133 in accordance to information of the database of the electronic device 100 that is set to call the memo program 1203 when sensing the indirect touch input.

According to another embodiment of the present disclosure, referring to the database of the electronic device 100, the electronic device 100 can be set to sense the indirect touch input of the input means 1201, and call the memo program 1203 when confirming that the input means keeps the indirect touch input even after the lapse of a designated time (e.g., one second). If determining that the input means keeps the indirect touch input of the input means 1201 during the designated time (e.g., one second) in a state of displaying a designated screen construction on the touch screen 133, the electronic device 100 can display the memo program 1203 on the touch screen 133.

According to an embodiment of the present disclosure, referring to the database of the electronic device 100, the electronic device 100 can be set to sense the indirect touch input of the input means 1201, and call the memo program 1203 when performing a designated operation (e.g., an operation of twice performing a direct touch input to a designated region of the screen construction). The electronic device 100 can determine that the touch pen is the registered input means 1201 by performing the indirect touch input of the input means 1201 in a state of displaying the designated screen construction on the touch screen 133. If determining that it twice performs the direct touch input to the designated region in which designated contents are not positioned in the screen construction displayed on the touch screen 133, the electronic device 100 can display the memo program 1203 on the touch screen 133.

Referring to (1) of FIG. 12B, an electronic device 100 can sense an indirect touch input that the user performs to a touch screen 133 with one or more input means. The electronic device 100 can acquire a capacitance variation caused by the input means sensed on the touch screen 133. Based on the acquired capacitance variation, the electronic device 100 can determine whether a 1st input means 1211 and a 2nd input means 1213 performing an indirect touch input to the touch screen 133 is the input means registered to the database of the electronic device 100. The electronic device 100 can be set to register one or more input means to the database of the electronic device 100 and, when sensing the registered input means, call one or more programs executable in the electronic device 100 or output information about the one or more programs. According to an embodiment of the present disclosure, the electronic device 100 can be set to register the 1st input means (e.g., a thumb of a left hand) and the 2nd input means (e.g., a thumb of a right hand) to the database of the electronic device 100, and display a list of one or more programs executable in the electronic device 100 on the touch screen 133 when sensing that the 1st input means and the 2nd input means perform an indirect touch input to a designated region of the touch screen 133.

Referring to (1) and (2) of FIG. 12B, the electronic device 100 can sense an indirect touch input of the 1st input means 1211 performed in a 1st region 1210 designated to the touch screen 133, and an indirect touch input of the 2nd input means 1213 performed in a 2nd region 1212 designated to the touch screen 133. With reference to the database, the electronic device 100 can determine that the 1st input means 1211 and/or the 2nd input means 1213 inputted to the touch screen 133 are registered input means. If a user performs the indirect touch input to the 1st region 1210 and the 2nd region 1212 of the touch screen 133 with the 1st input means 1211 and 2nd input means 1213 registered with reference to the database, the electronic device 100 can call one or more Social Networking Service (SNS) programs executable in the electronic device 100 in response to the indirect touch input. According to an embodiment of the present disclosure, if sensing the indirect touch input performed in one or more regions among the designated 1st region 1210 and 2nd region 1212 of the touch screen 133 with one or more input means among the 1st input means 1211 and 2nd input means 1213 registered to the database, the electronic device 100 can display by a pop-up 1215 one or more designated programs among SNS programs such as a Kakao™ program 1217, a Facebook™ program 1219, and a Between™ program 1221 executable in the electronic device 100, on either the designated region 1210 or 1213 of the touch screen 133 or a new layer thereof.

Figure 13:
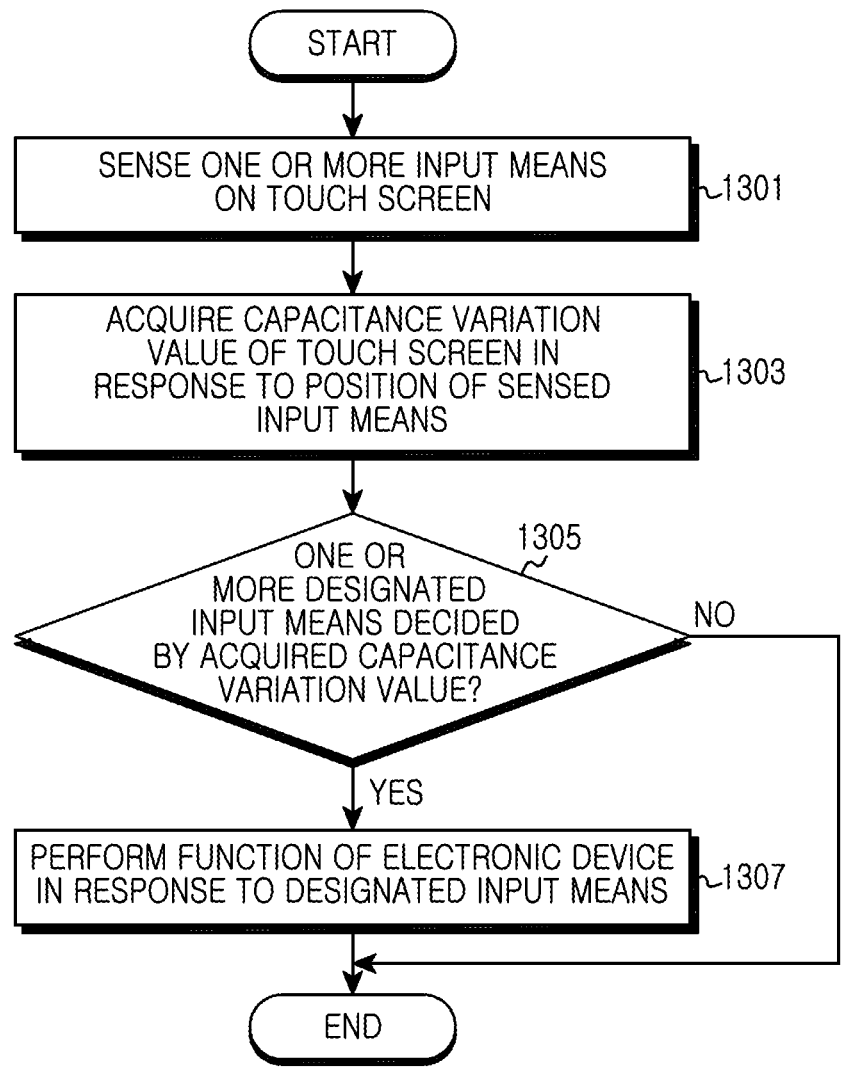
FIG. 13 is a flowchart illustrating an operation of an electronic device according to an embodiment of the present disclosure.

FIG. 13 is a flowchart illustrating an operation of an electronic device according to an embodiment of the present disclosure.

Referring to FIGS. 1 and 13, an electronic device 100 can acquire information about a capacitance variation corresponding to an indirect touch input or a direct touch input that a user performs to a touch screen 133 with one or more input means. With reference to the acquired information about the capacitance variation, the electronic device 100 can determine an input means registered to a database of the electronic device 100. If the database includes information about an input means and an operation performed in the electronic device 100 in response to the indirect touch input and/or direct touch input performed with the input means, the electronic device 100 can perform a function of the electronic device 100 in accordance to the included information.

Referring to FIG. 13, in operation 1301, the electronic device 100, as illustrated in FIG. 1, can sense one or more indirect touch inputs performed to the touch screen 133, as illustrated in FIG. 1. According to an embodiment of the present disclosure, if an input means is positioned within a designated distance from a surface of the touch screen 133, the electronic device 100 can acquire information about a capacitance variation sensing an input to the touch screen 133. The electronic device 100 can be set to determine that a user inputs an instruction to the touch screen 133 of the electronic device 100, when the electronic device 100 acquires information of a designated capacitance variation quantity or more with respect to a designated capacitance variation.

In operation 1303, the electronic device 100 can acquire information about the capacitance variation corresponding to the indirect touch input of the input means inputted to the touch screen 133. According to an embodiment of the present disclosure, the electronic device 100 can acquire the information about the capacitance variation corresponding to the indirect touch input of the input means performed to the touch screen 133. Though the user performs the indirect touch input to the touch screen 133 in the same method in accordance to electromagnetic properties (or characteristics) of the input means, the touch screen 133 of the electronic device 100 can show each different or unique capacitance variation in accordance to the input means. The electronic device 100 can acquire information about a capacitance variation of a designated position of the touch screen 133 in response to the indirect touch input of the input means to the touch screen 133.

In operation 1305, the electronic device 100 can determine whether the input means has been registered to the database of the electronic device 100, based on the information about the capacitance variation acquired in response to the indirect touch input of the input means to the touch screen 133. According to an embodiment of the present disclosure, the electronic device 100 can determine whether the input means performing the indirect touch input to the touch screen 133 of the electronic device 100 is an input means registered to the database of the electronic device 100, with reference the information about the acquired capacitance variation and information about the input means registered to the database. If the input means performing the indirect touch input to the touch screen 133 is determined as the input means registered to the database of the electronic device 100, the electronic device 100 can perform operation 1307. If the input means is determined as a non-registered input means, the electronic device 100 can terminate the embodiment of the present disclosure of FIG. 13.

In operation 1307, with reference to the database of the electronic device 100, the electronic device 100 can perform a designated operation of the electronic device 100 in correspondence to the input means determined according to the information about the capacitance variation and/or a gesture input performed with the input means. According to an embodiment of the present disclosure, when the input means is determined as the input means registered to the database, the electronic device 100 can change a mode applicable to displaying on the touch screen 133, in response to the indirect touch input and/or direct touch input performed to the touch screen 133. According to another embodiment of the present disclosure, the electronic device 100 can perform an operation of, by sensing the indirect touch input and/or direct touch input of the input means registered to the database performed in a designated operation of the touch screen 133, calling one or more programs executable in the electronic device 100 or displaying a list of one or more programs designated to a gesture inputted to the touch screen 133.

After performing operation 1307, the electronic device 100 can terminate the embodiment of the present disclosure of FIG. 13.

Referring to FIG. 1, in performing various embodiments of the present disclosure, the electronic device can perform operations according to various embodiments through a program of the memory 110, and can also directly control the operations through a processor. Also, the electronic device 100 can also perform the various embodiments of the present disclosure through a control module connected with the processor.

According to various embodiments of the present disclosure, in an operation method of an electronic device, if an input means is positioned in a 1st position on a touch screen through a processor or a control module, the electronic device can acquire 1st sensing information of a preset point on the touch screen. If the input means is positioned in a 2nd position on the touch screen, the electronic device can acquire 2nd sensing information of the preset point on the touch screen, and can control to determine the input means based on a variation of the acquired 1st sensing information and 2nd sensing information. According to an embodiment of the present disclosure, the processor and the control module can control an operation of sensing that a user performs an indirect touch input to the touch screen with the input means, and acquiring the 1st sensing information and the 2nd sensing information. According to an embodiment of the present disclosure, the processor or the control module can control an operation of sensing that the user performs the indirect touch input to the touch screen with the input means, and acquiring the 1st sensing information and the 2nd sensing information. According to an embodiment of the present disclosure, the processor or the control module can control to acquire area information corresponding to the input means and/or electromagnetic field variation pattern information, through an electromagnetic field varying in according to the indirect touch input. According to an embodiment of the present disclosure, the processor or the control module can control an operation of determining the input means with reference to a database including a plurality of sensing information previously stored in the memory, and a function set to the input means. According to an embodiment of the present disclosure, the processor or the control module can control to perform a function corresponding to the determined input means. According to an embodiment of the present disclosure, if determining a plurality of input means positioned on the touch screen, the processor or the control module can control to perform a function corresponding to each of the determined input means. According to an embodiment of the present disclosure, the processor or the control module can control an operation of inputting a gesture with the input means, and an operation of performing an instruction corresponding to the gesture by a preset function of the input means. According to an embodiment of the present disclosure, if a plurality of input means positioned on the touch screen are determined as input means of a predefined combination, the processor or the control module can control an operation of performing a function corresponding to the input means of the predefined combination The electronic device can acquire an effective area of an input means positioned on a touch screen to identify the input means, and can provide a User Experience (UX) executable corresponding to various instructions by identifying various input means. The electronic device can identify the input means through the touch screen, without a separate device connectable with the input means.

Methods according to various embodiments of the present disclosure disclosed in claims and/or specification of the disclosure can be implemented in a form of hardware, software, or a combination of hardware and software. If the methods are implemented by the software, a non-transitory computer-readable storage medium storing one or more programs (i.e., software modules) can be provided. The one or more programs stored in the computer-readable storage medium are configured to be executed by one or more processors within an electronic device. The one or more programs can include instructions for enabling the electronic device to execute the methods according to the various embodiments disclosed in the claims and/or specification of the present disclosure.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs can be stored in a memory constructed by a combination of some or all of them. Also, each constructed memory may be included in plural.

Also, the programs can be stored in an attachable storage device accessible to the electronic device through a communication network such as the Internet, an intranet, a Local Area Network (LAN), a Wireless LAN (WLAN) and a Storage Area Network (SAN) or a communication network constructed by a combination of them. This storage device can access the electronic device through an external port. Also, a separate storage device on the communication network may access a portable electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
   acquiring, in a state where an end of a 1st input means approaching a touch screen of the electronic device is positioned in a 1st position spaced apart from the touch screen of the electronic device, 1st information indicating a 1st cross-section area of the 1st input means in the 1st position when the end of the 1st input means is positioned in the 1st position, based on a 1st difference value of a capacitance in the 1st position;

acquiring, in a state where the end of the 1st input means approaching the touch screen is moved from the 1st position to a 2nd position spaced apart from the touch screen, 2nd information indicating a 2nd cross-section area of the 1st input means in the 1st position when the end of the 1st input means is positioned in the 2nd position, based on a 2nd difference value of the capacitance in the 1st position;

identifying, among a plurality of types of input means registered as associated with a plurality of cross-section areas in the electronic device, a type of the 1st input means approaching the touch screen before the end of the 1st input means is contacted with the touch screen, the identified type of the 1st input means corresponding to both the 1st cross-section area and the 2nd cross-section area;

detecting that the end of the 1st input means approaching the touch screen from the 2nd position is contacted with the touch screen; and displaying, in response to the detecting, a representation corresponding to the type of the 1st input means that corresponds to both the 1st cross-section area and the 2nd cross-section area, via the touch screen.

2. The method of claim 1,
wherein the 1st cross-section area corresponds to the 1st difference value, and
wherein the 2nd cross-section area corresponds to the 2nd difference value.

3. The method of claim 1, further comprising:
acquiring, in a state where an end of a 2nd input means is positioned in the 1st position spaced apart from the touch screen, 3rd information indicating a 1st cross-section area of the 2nd input means in the 1st position when the end of the 2nd input means is positioned in the 1st position, based on a 3rd difference value of the capacitance in the 1st position;

acquiring, in a state where the end of the 2nd input means is moved from the 1st position to the 2nd position spaced apart from the touch screen, 4th information indicating a 2nd cross-section area of the 2nd input means in the 1st position when the end of the 2nd input means is positioned in the 2nd position, based on a 4th difference value of a capacitance in the 2nd position; and identifying, among the plurality of types of input means registered as associated with the plurality of cross-section areas in the electronic device, a type of the 2nd input means approaching the touch screen, before the 2nd input means is contacted with the touch screen, the identified type of the 2nd input means corresponding to both the 1st cross-section area and the 2nd cross-section area of the 2nd input means.

4. The method of claim 3, further comprising:
detecting that the end of the 2nd input means is contacted with the touch screen; and
displaying, in response to detecting that the end of the 2nd input means moved from the 2nd position is contacted with the touch screen, another representation corresponding to the identified type of the 2nd input means via the touch screen,
wherein the other representation is distinct from the representation.

5. The method of claim 1, wherein the type of the 1st input means is identified as one of a pen type, an eraser type, and a finger type.

6. An electronic device comprising:
a processor;
a memory connected with the processor; and
a touch screen connected with the processor,
wherein the processor and the memory are programmed to:
acquire, in a state where an end of a 1st input means approaching the touch screen is positioned in a 1st position spaced apart from the touch screen, 1st sensing information indicating a 1st cross-section area of the 1st input means in the 1st position when the end of the 1st input means is positioned in the 1st position, based on a 1st difference value of a capacitance in the 1st position, acquire, in a state where the end of the 1st input means approaching the touch screen is moved from the 1st position to a 2nd position spaced apart from the touch screen, 2nd information indicating a 2nd cross-section area of the 1st input means in the 1st position when the end of the 1st input means is positioned in the 2nd position, based on a 2nd difference value of the capacitance in the 1st position, identify, among a plurality of types of input means registered as associated with a plurality of cross-section areas in the electronic device, a type of the 1st input means approaching the touch screen before the end of the 1st input means is contacted with the touch screen, the identified type of the 1st input means corresponding to both the 1st cross-section area and the 2nd cross-section area, detect that the end of the 1st input means approaching the touch screen from the 2nd position is contacted with the touch screen, and display, in response to the detecting, a representation corresponding to the type of the 1st input means that corresponds to both the 1st cross-section area and the 2nd cross-section area, via the touch screen.

7. The electronic device of claim 6, wherein the processor and the memory are further programmed to:
acquire, in a state where an end of a 2nd input means is positioned in the 1st position, 3rd information indicating a 1st cross-section area of the 2nd input means in the 1st position when the end of the 2nd input means is positioned in the 1st position, based on a 3rd difference value of the capacitance in the 1st position, acquire, in a state where the end of the 2nd input means is moved from the 1st position to the 2nd position, 4th information indicating a 2nd cross-section area of the 2nd input means in the 1st position when the end of the 2nd input means is positioned in the 2nd position, based on a 4th difference value of a capacitance in the 2nd position, identify, among the plurality of types of input means registered as associated with the plurality of cross-section areas in the electronic device, a type of the 2nd input means approaching the touch screen, before the end of the 2nd input means is contacted with the touch screen, the identified type of the 2nd input means corresponding to both the 1st cross-section area and the 2nd cross-section area of the 2nd input means, detect that the end of the 2nd input means is contacted with the touch screen, and display, in response to detecting that the end of the 2nd input means moved from the 2nd position is contacted with the touch screen, another representation corresponding to the identified type of the 2nd input means via the touch screen, and wherein the other representation is distinct from the representation.

8. The electronic device of claim 6, wherein the 1st cross-section area corresponds to the 1st difference value, and wherein the 2nd cross-section area corresponds to the 2nd difference value.

9. A non-transitory computer-readable recording medium having a database and a program recorded thereon, the program causing a computer to execute a method comprising:

acquiring, in a state where an end of a 1st input means approaching a touch screen of an electronic device is positioned in a 1st position spaced apart from the touch screen, 1st information indicating a 1st cross-section area of the 1st input means in the 1st position when the end of the 1st input means is positioned in the 1st position, based on a 1st difference value of a capacitance in the 1st position;

acquiring, in a state where the end of the 1st input means approaching the touch screen is moved from the 1st position to a 2nd position spaced apart from the touch screen, 2nd information indicating a 2nd cross-section area of the 1st input means in the 1st position when the end of the 1st input means is positioned in the 2nd position, based on a 2nd difference value of the capacitance in the 1st position;

identifying, among a plurality of types of input means registered as associated with a plurality of cross-section areas in the electronic device, a type of the 1st input means approaching the touch screen before the end of the 1st input means is contacted with the touch screen, the identified type of the 1st input means corresponding to both the 1st cross-section area and the 2nd cross-section area;

detecting that the end of the 1st input means approaching the touch screen from the 2nd position is contacted with the touch screen; and displaying, in response to the detecting, a representation corresponding to the type of the 1st input means that corresponds to both the 1st cross-section area and the 2nd cross-section area, via the touch screen.

* * * * *